US011180323B2

(12) United States Patent
Middelberg et al.

(10) Patent No.: US 11,180,323 B2
(45) Date of Patent: Nov. 23, 2021

(54) SYSTEMS AND METHODS FOR PROVIDING GAPS IN ARTICLE OR PACKAGE PROCESSING

(71) Applicant: Bell and Howell, LLC, Durham, NC (US)

(72) Inventors: Neal J. Middelberg, Apex, NC (US); Richard D. Johnson, Fuquay Varina, NC (US); Taner Lee Howard, Raleigh, NC (US)

(73) Assignee: Bell and Howell, LLC, Durham, NC (US)

( * ) Notice: Subject to any disclaimer, the term of this patent is extended or adjusted under 35 U.S.C. 154(b) by 292 days.

(21) Appl. No.: 16/381,471

(22) Filed: Apr. 11, 2019

(65) Prior Publication Data

US 2019/0315573 A1    Oct. 17, 2019

Related U.S. Application Data

(60) Provisional application No. 62/656,208, filed on Apr. 11, 2018, provisional application No. 62/657,407, filed on Apr. 13, 2018.

(51) Int. Cl.
*B65G 47/29* (2006.01)
*B65G 15/30* (2006.01)
(Continued)

(52) U.S. Cl.
CPC .......... *B65G 47/29* (2013.01); *B23K 26/362* (2013.01); *B65G 15/30* (2013.01); *B23K 2101/007* (2018.08); *B65G 2201/02* (2013.01)

(58) Field of Classification Search
None
See application file for complete search history.

(56) References Cited

U.S. PATENT DOCUMENTS 2,771,177 A    11/1956  Cutter et al.
3,621,975 A *  11/1971  Vilen .................... B65G 47/29
                                                  198/460.1

(Continued)

FOREIGN PATENT DOCUMENTS

EP         0 747 304 A2    12/1996
WO    WO 2019/200096 A1    10/2019

OTHER PUBLICATIONS

International Search Report and Written Opinion for Application No. PCT/US2019/026982 dated Jul. 16, 2019.

(Continued)

*Primary Examiner* — Kavel Singh
(74) *Attorney, Agent, or Firm* — Jenkins, Wilson, Taylor & Hunt, P.A.

(57) ABSTRACT

Systems and methods for providing gaps in article or package processing. In some embodiments, the system can include a conveying path along which a first advanced article and a second advanced article can be advanced. The system can further include a first stop location and a second stop location. The first stop location can include movable fingers that are configured to raise to stop the advance of the articles and then lower at specific times to allow the articles to advance with specific distances between the articles. Additionally, the system can include a paddle that also raises and lowers. The paddle lowers to stop an advancing article again, and in doing so, front-end registers the article. Then the paddle can raise to allow the package to advance again along the conveyor.

38 Claims, 17 Drawing Sheets

(51) Int. Cl.
  *B65G 47/00* (2006.01)
  *B23K 26/362* (2014.01)
  *B23K 101/00* (2006.01)

(56) References Cited

U.S. PATENT DOCUMENTS

| | | | |
|---|---|---|---|
| 4,041,677 A | 8/1977 | Reid | |
| 4,296,590 A * | 10/1981 | Focke | B65G 47/32 198/419.1 |
| 5,070,992 A | 12/1991 | Bonkowski | |
| 8,037,992 B2 * | 10/2011 | Ackley, Jr. | B65G 47/24 198/384 |

OTHER PUBLICATIONS

Canadian Office Action for Application No. 3085892 dated Sep. 17, 2021.

* cited by examiner

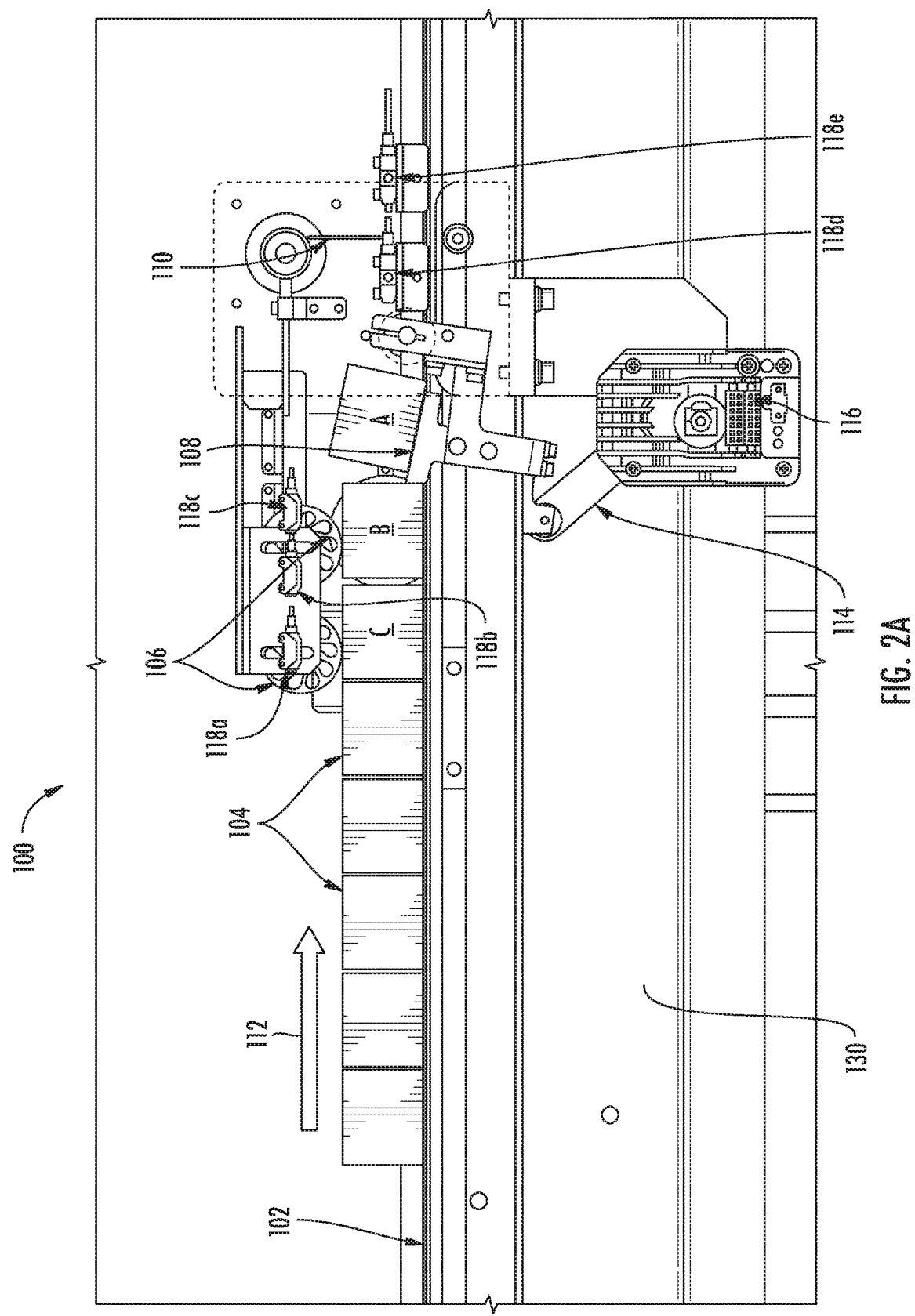

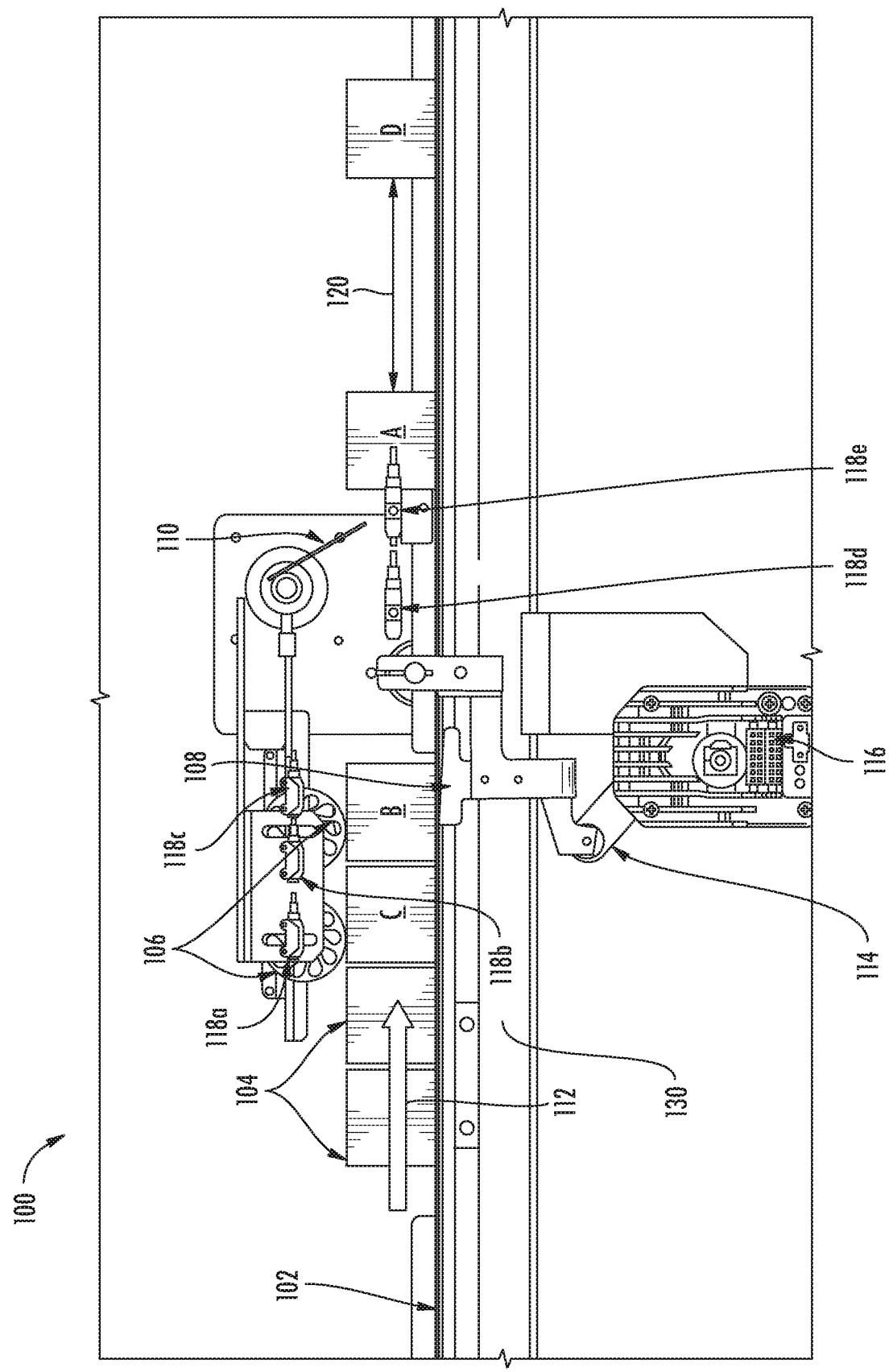

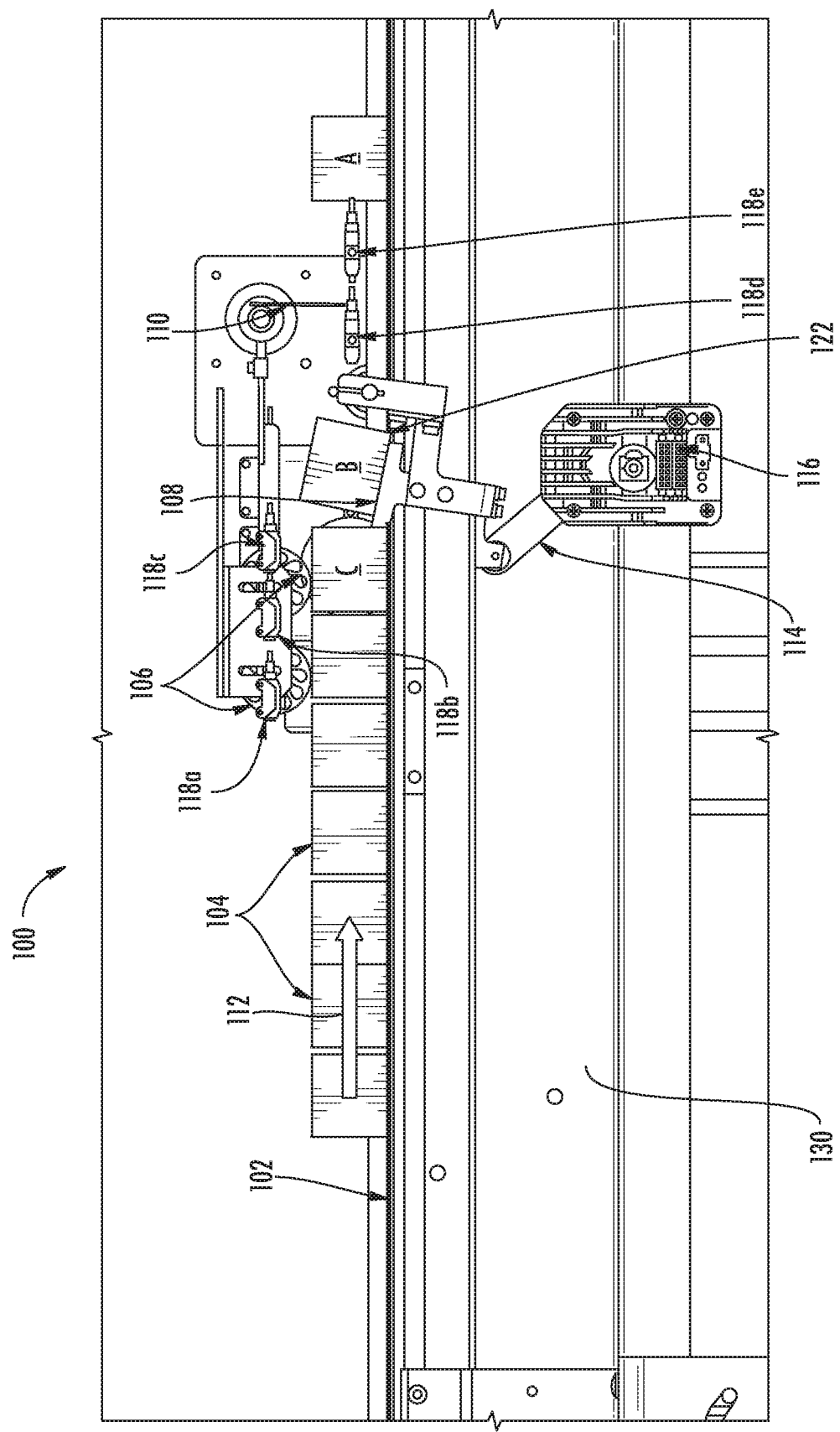

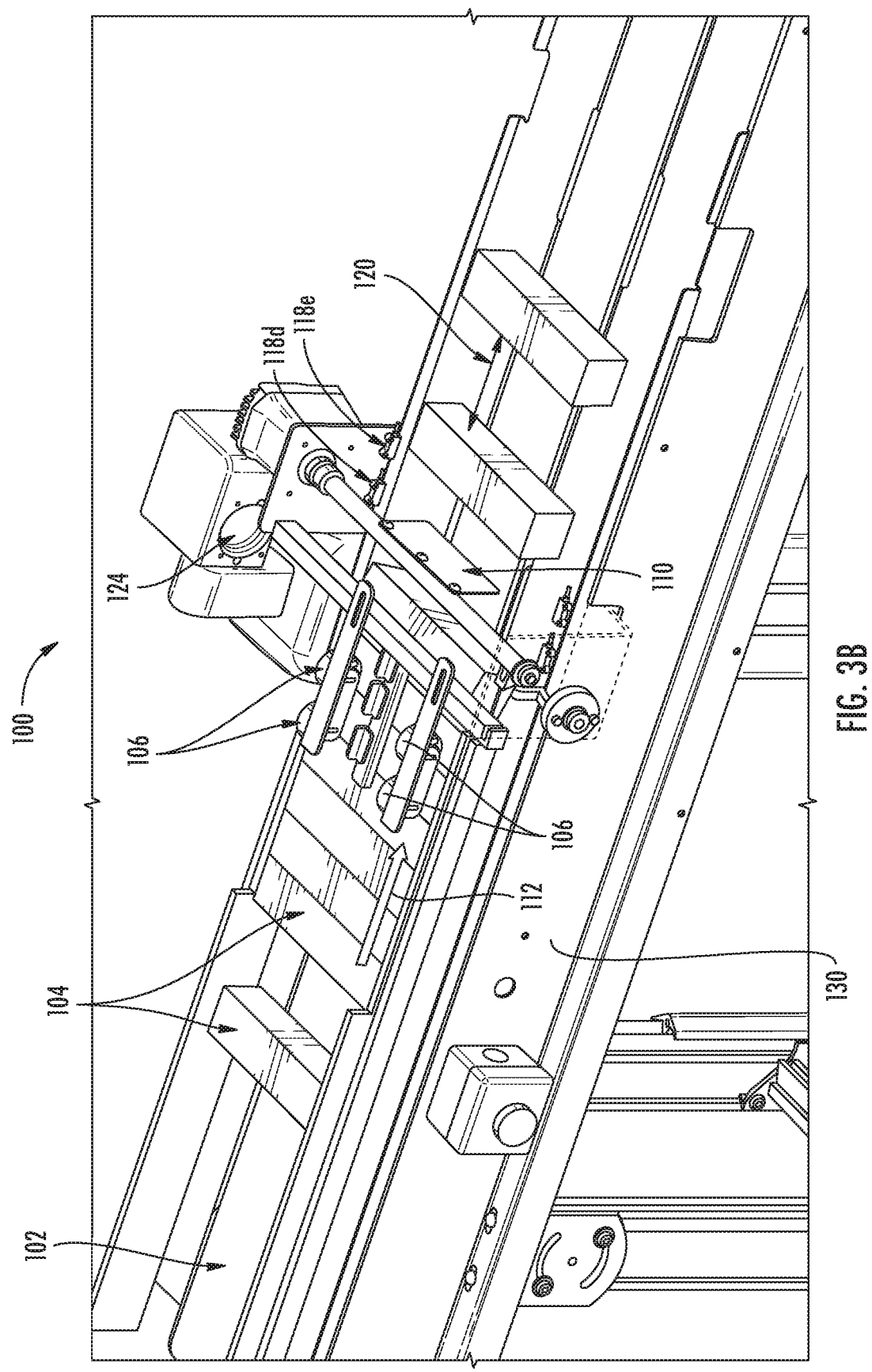

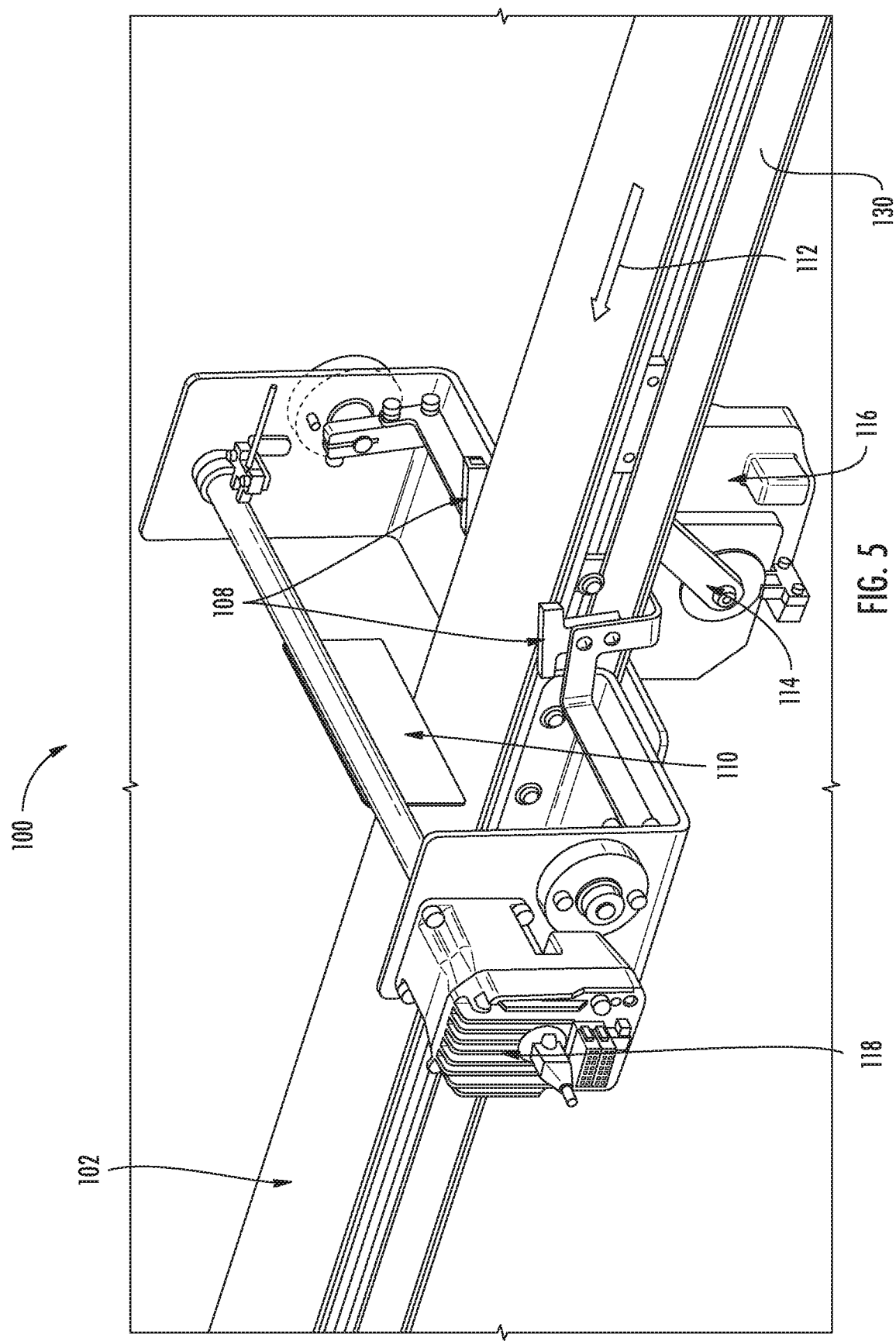

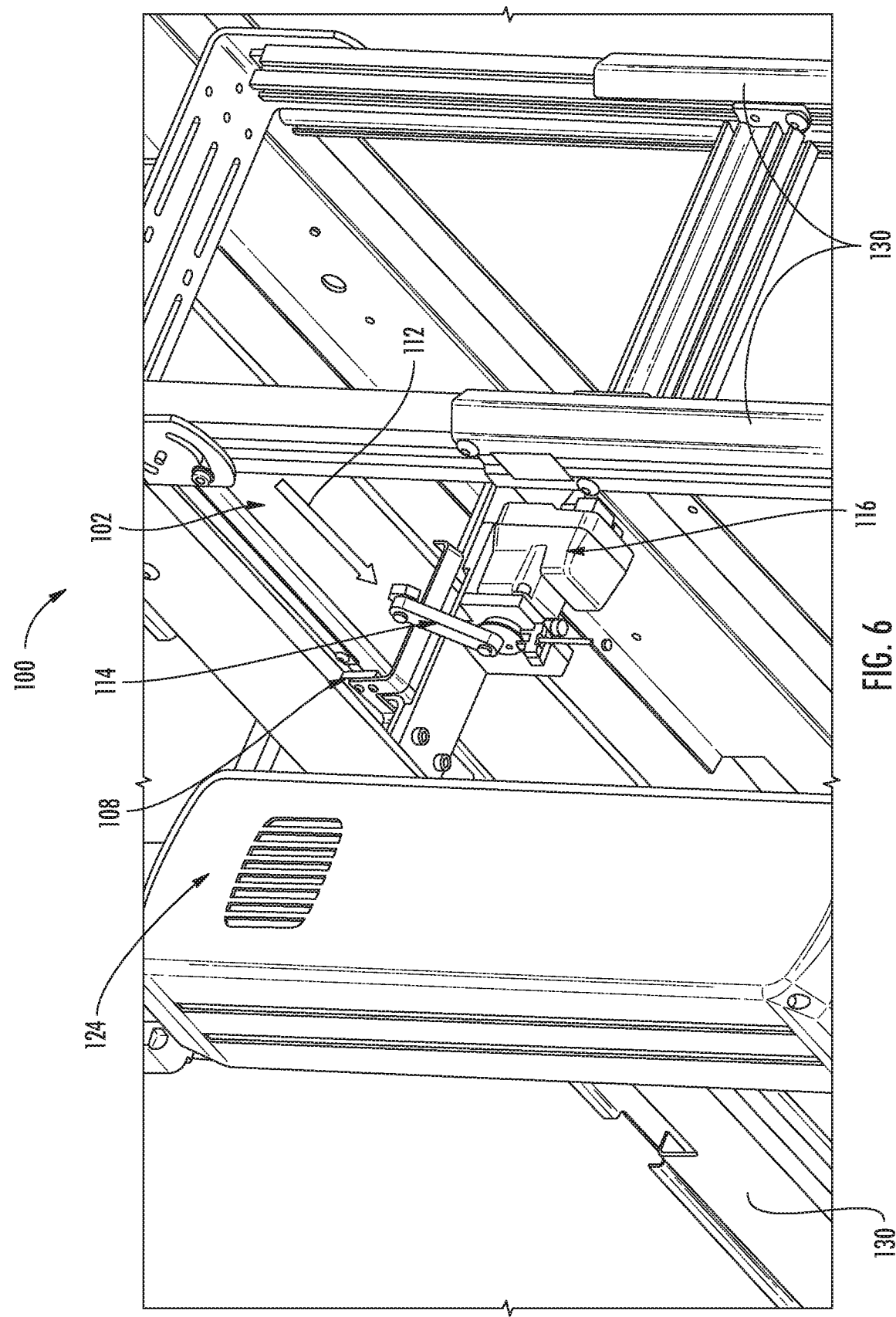

SYSTEMS AND METHODS FOR PROVIDING GAPS IN ARTICLE OR PACKAGE PROCESSING

CROSS-REFERENCE TO RELATED APPLICATION

The present application claims priority to both U.S. Provisional Patent Application Ser. No. 62/656,208, filed Apr. 11, 2018, and U.S. Provisional Patent application Ser. No. 62/657,407, filed Apr. 13, 2018, the entire disclosures of which are incorporated by reference herein.

TECHNICAL FIELD

The subject matter disclosed herein relates generally to article and/or package processing. More particularly, the subject matter disclosed herein relates to systems and methods for providing gaps in article and/or package processing along a conveying path.

BACKGROUND

Inspection stations, which have the function of ensuring product integrity in many fields, but especially in the pharmaceutical industry, are becoming more common recently, based mostly on demand caused by the U.S. Drug Supply Chain Security Act. The inspection stations, in some cases, need to be configured to mark indicia on parcels, boxes, or cartons and inspect the indicia and other markings from the parcels, boxes, or cartons. During the inspection process, it is desirable to space apart or separate each of the parcels, boxes, or cartons the same distance such that inspection can be done properly.

Companies are being required to comply with the U.S. Drug Supply Chain Security Act (DSCSA) for serialization compliance of controlled substances, such as prescription medications. Pharmaceutical companies throughout the United States are currently working towards serialization compliance. As of November 2017, the DSCSA requires that all pharmaceutical manufacturers serialize products down to the item level, including a product identifier on labels and cases. Information on product transactions, as drugs make their way through the supply chain, must also be recorded.

Inspection stations to ensure product integrity and meet serialization requirements, such as that defined in the DSCSA, are becoming more common and in demand every day. Currently, the technologies used to separate material for inspection might include manual gapping, the use of two conveyors (e.g., one upstream and one downstream, where the downstream conveyor runs at a faster speed), or the use of expensive robotic systems that physically reposition the product. These systems can be difficult to implement, require considerably more foot print, and often require special programming with additional support equipment.

Currently, the technologies used to separate material for inspection include manual gapping, the use of two conveyors where the downstream conveyor runs at a faster speed, or the use of expensive robotic systems that physically reposition the parcels, boxes, or cartons. These systems can be difficult to implement, require considerably more foot print, and often require special programming with additional support equipment.

Current systems may also include indexing transports or belting designs that have partitions or pleats. One drawback with this technology is that the items being inspected would typically be registered against the transport flight, which would then be within the field of view of the inspection devices. A flat belt would not have this issue. Using two belts, where the downstream belt runs faster may work fine for larger boxes, but it does not address the issue where slipping can occur between them. This is what can cause a carton to skew. This solution also may introduce material handling problems between the conveyors, particularly for smaller cartons.

SUMMARY

In accordance with this disclosure, systems and methods for providing gaps in article or package processing along a conveying path are provided that do not suffer from some or all of the disadvantages of the current technology discussed above. In one embodiment, a method for article processing is provided, the method comprising: advancing, using a conveyor, a first article along a conveying path; stopping, by actuating one or more fingers into a deployed position, the first article at a first stop location along the conveying path, the one or more fingers being located at, or adjacent to, the first stop location; releasing, by actuating the one or more fingers into a retracted position, the first article from the first stop location; advancing, using the conveyor, the first article along the conveying path from the first stop location to a second stop location; stopping, by actuating one or more paddles into a lowered position, the first article at the second stop location, the one or more paddles being located at, or adjacent to, the second stop location; releasing, by actuating the one or more paddles into a raised position, the first article from the second stop location; advancing, using the conveyor, the first article along the conveying path from the second stop location; advancing, using the conveyor, a second article along the conveying path to a first position; stopping, by actuating the one or more fingers into the deployed position, the second article at the first stop location; releasing, by actuating the one or more fingers into the retracted position, the second article from the first stop location; advancing, using the conveyor, the second article along the conveying path from the first stop location to the second stop location; stopping, by actuating the one or more paddles into the lowered position, the second article at the second stop location; releasing, by actuating the one or more paddles into the raised position, the second article from the second stop location; and advancing, using the conveyor, the second article along the conveying path from the second stop location; wherein the second article is released such that the second article is separated along the conveying path from the first article by a gap.

In another embodiment of the present disclosure, in the deployed position, the one or more fingers extend above a surface of the conveyor at a height sufficient to stop movement of the first and second articles moving along the conveying path at the first stop location and, in the retracted position, the one or more fingers are retracted to a same height as, or below the surface of, the conveyor so that the first and second articles pass over the one or more fingers at the first stop location.

In some embodiments of the present disclosure, a system for article processing is provided, the system comprising: a conveyor configured to advance a first article and a second article along a conveying path; one or more fingers located at, or adjacent to, a first stop location along the conveying path, the one or more fingers being configured to move between a deployed position and a retracted position for stopping the first article at the first stop location and releasing the first article from the first stop location; and one or more paddles located at, or adjacent to, a second stop location along the conveying path, the one or more paddles being configured to move between a lowered position and a raised position for stopping the first article at the second stop location and releasing the first article from the second stop location, such that the first article can be advanced by the conveyor along the conveying path beyond the second stop location; wherein the one or more fingers are configured to, after the first article is released from the first stop location, stop the second article at the first stop location and then release the second article from the first stop location; wherein the one or more paddles are configured to, after the first article is released from the second stop location, stop the second article at the second stop location; and wherein the system is configured to release the second article from the second stop location to move, via the conveyor, along the conveying path such that the second article is separated along the conveying path from the first article by a gap.

Although some aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present disclosure will be more readily understood from the following detailed description which should be read in conjunction with the accompanying, example figures that are given merely by way of explanatory and non-limiting example. The detailed description that follows this section references the example figures briefly described below.

FIGS. 2A, 2B, 2C, 2D, 2E, and 2F are side views of the system shown in FIG. 1 at various stages of operation according to an example embodiment of a method for article and/or package processing.

FIGS. 3A, 3B, and 3C are perspective views of the system shown in FIG. 1 at various stages of operation according to an example embodiment of a method for article and/or package processing.

FIG. 5 is a perspective view of the system shown in FIG. 1 without any boxes or cartons present to better visualize the features of the system.

FIG. 6 is a perspective view from underneath the system shown in FIG. 1 to better visualize the features of the system that may not be shown in the previous figures.

DETAILED DESCRIPTION

In accordance with this disclosure, systems, devices and methods are disclosed for providing gaps in article and/or package processing. In some aspects, the disclosure herein can be referred to and used as a carton gapper and registration system. The disclosure herein will be particularly advantageous for the increasing demands and requirement for serialization and aggregation in package processing, such as, for example, in the pharmaceutical industry. Articles or packages herein can, for example and without limitation, comprise paper or cardboard boxes or cartons that contain product(s) therein, or any other suitable object desired to be processed. The disclosure herein can be used, for example, to gap and front-end register cartons and boxes in a manner that is mechanically simple and very cost effective. The technology can be used anywhere gap control is required. The technology can advantageously be used with vision systems and packaging applications where the success and reliability of the processing is highly dependent on product stability, e.g., having articles or packages that are properly gapped and registered.

Example features and advantages of the present subject matter will be more readily understood from the description herein.

Figure 1:
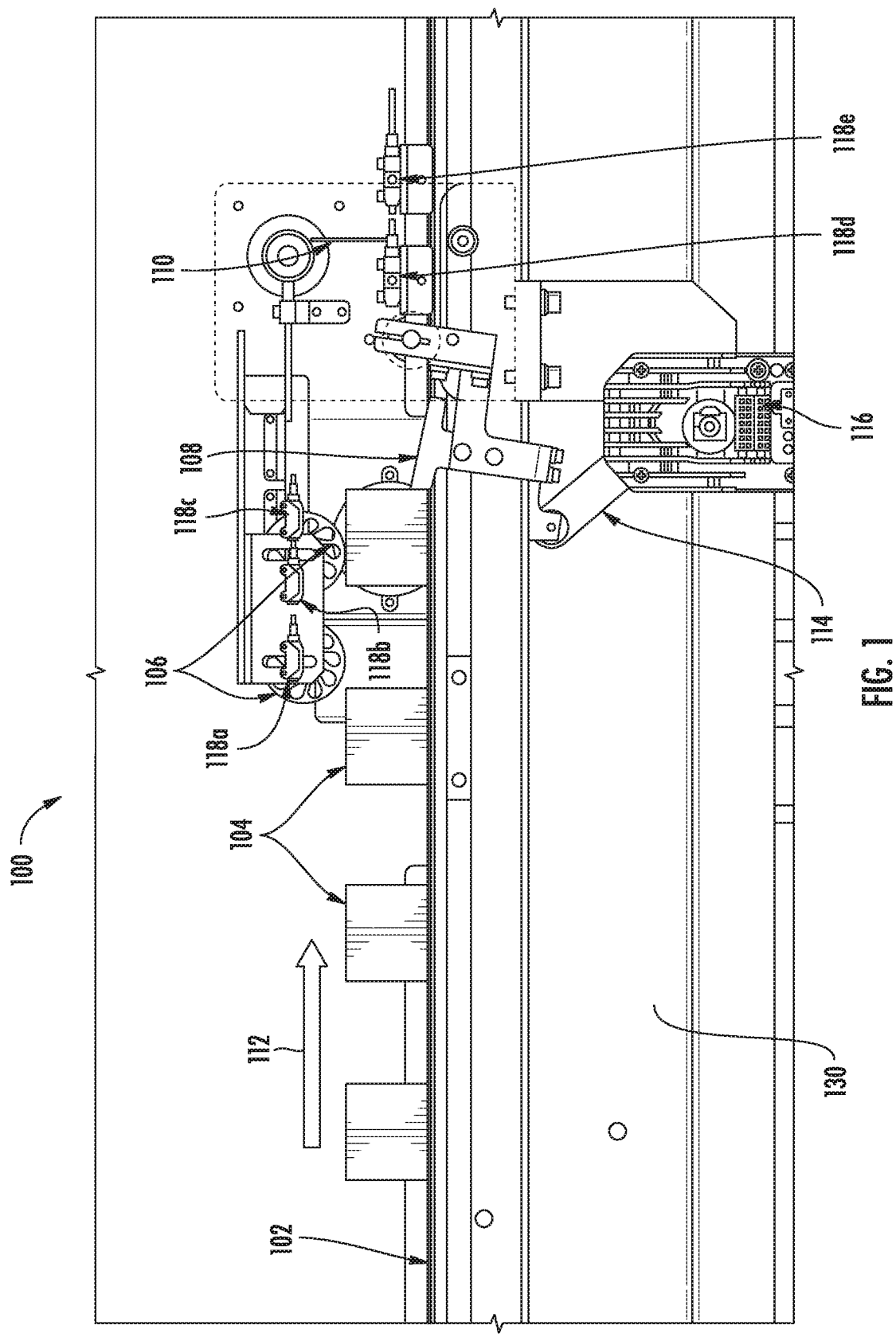
FIG. 1 is a side view of a system for article and/or package processing according to an embodiment of the presently disclosed subject matter.

In accordance with aspects of the disclosure herein, systems and methods are disclosed for creating a consistent gap between boxes and/or cartons and maintaining orthogonal registration to a conveyor, so that the boxes or cartons can readily be marked and/or inspected by various systems, including, for example, laser printing, imaging, and/or density measurement. In some embodiments, a four-bar linkage is used to raise lift forks and/or fingers, also referred to as fingers, lift fingers, or stops, from underneath a conveyor path into a deployed position to stop an oncoming box and/or carton. These fingers straddle a transport or conveyor belt, which is narrower than the boxes and/or cartons being transported along the conveyor path. When multiple cartons are being processed (e.g., sequentially), the fingers will first drop beneath the surface of the conveyor belt into a retracted position for a sufficient time, based on the transport speed of the conveyor belt, to allow a first carton, which is pressed against the leading surface of the fingers, to pass beyond at least the leading edge of the fingers. After the first carton has been transported beyond at least the leading edge of the fingers to such a degree that the first carton will not become partially rotated and/or overturned (e.g., in a counterclockwise direction, as shown in FIG. 1) when the fingers return to the deployed position, the fingers are moved back into the deployed position to stop the next carton on the conveyor path. The motion profile of the lift mechanism between the retracted and deployed positions smoothly raises the carton without flipping the carton over or losing drive. A registration paddle assembly is positioned after, relative to the transport direction of the cartons along the conveyor path, the fingers. The registration paddle assembly is configured to further stop and release cartons moving along the conveyor path. The registration paddle assembly can be configured to pivotably and repeatedly raise and lower to respectively release and stop cartons positioned against the registration paddle assembly. The motion profile of the registration paddle was designed to ensure no slippage between the carton and belt at the moment the paddle lets go of the carton. This is what keeps the carton orthogonal to the belt. Without this motion profile, the carton could easily twist on the belt due to slight variations in the center of gravity or frictional differences on the belt. With this scheme, the conveyor belt transporting the box or carton can move at constant velocity, i.e. there is no need for a more complicated index profile. The timing of events is, in some embodiments, based on photocells and the precise motion profiles of the lift fingers and registration paddle assemblies.

In accordance with the disclosure and figures herein, depending on the box size, the mechanisms used to gap and register a box occupy a comparatively small footprint. Because the mechanisms are independent and, in some embodiments, photocell based, the timing is inherently robust and well suited for a cost effective programmable logic controller (PLC). While a four-bar linkage mechanism is, in one aspect, used to raise the fingers, any other suitable mechanism could be used, as can be appreciated by persons of skill in the art. The use of the four-bar linkage mechanism is, in such embodiments, advantageous by ensuring a smooth motion profile and excellent mechanical reliability. The design is based on using a relatively low-cost flat belt that runs continuously and does not, typically, have features such as pleats that might cause sensing issues. The flat belt profile is conducive to an immediate downstream Inspection station. Because the carton, box, or package is momentarily stationary when it is stopped by making contact with the fingers in the deployed position, there is ample time to burn a laser image (or print) that might include a one-dimensional (1D) or two-dimensional (2D) barcode, identification number, date code, indicia, or other useful information.

The systems and methods described hereinabove will be explained in greater detail hereinbelow with reference to the figures.

Referring now to FIG. 1, the present subject matter discloses a system for article and/or package processing, referred to hereinafter as article gapping system 100. In some embodiments, the article gapping system 100 comprises a conveyor 102 supported by a frame 130. In some embodiments, the conveyor 102 can comprise a continuous conveyor system that travels along and/or over frame 130, which can also be, for example, a platform, housing, table, support structure, or any other suitable structure that can hold the conveyor 102 as it moves. The structure that the conveyor 102 moves along in some embodiments is also the structure that the articles 104, which can be, for example, goods, packages, cartons, or any object suitable for transport along article gapping system, move along as well. Therefore, in some embodiments, the frame 130 that supports the conveyor 102 can also be built to withstand the forces and weight applied to it by any of the articles 104 on the conveyor 102.

In some embodiments, the conveyor 102 has articles 104 arranged on top of, or otherwise riding along, the conveyor 102. In some embodiments, the articles 104 comprise a continuous and/or random stream of cartons, boxes, packages, goods, parcels, or the like. By continuous or random stream, the present disclosure should be interpreted to mean that the articles 104 can be placed on the conveyor 102 with any distance between them before contacting the fingers 108. Additionally, in some embodiments, there can be one or any number of articles 104 placed on the conveyor 102, including a continuous feed of articles 104 on the conveyor 102 or articles 104 placed on the conveyor 102 randomly. For example and without limitation, the articles 104 could be introduced onto the conveyor 102 in bursts or, in some embodiments, there could be a continuous feed of articles 104 onto the conveyor 102. Hereinafter, the articles 104 may also be referred to as cartons, boxes, packages, goods, parcels, or any other suitable term as would be understood by a person having ordinary skill in the art. In some embodiments, the articles 104 may comprise any of a plurality of different shapes and sizes. In some embodiments, the articles 104 may all have substantially similar dimensions, being defined as items that are identical within an assembly or manufacturing tolerance range.

In some embodiments, the articles 104 are small boxes designed to carry medicinal or pharmaceutical goods. In further embodiments, the articles 104 may comprise appliances or other, much larger, goods. Additionally, in some embodiments, the articles 104 may be of different sizes, shapes, weights, or any other physical characteristic. Furthermore, the dimensions, sizes, weights, lengths, widths, heights, etc. of any of the components of the article gapping system 100 can be altered, changed, or otherwise adjusted to meet the demands of whatever size articles 104 the article gapping system 100 is configured to process. In some aspects, the present disclosure can be described as "front-end registering" of the articles 104. This can mean, for example, that articles 104 are aligned to be substantially parallel with respect to each other. Furthermore, persons having ordinary skill in the art will appreciate that this phrase can also be understood to be a seriatim process. In some embodiments, the articles 104 can be wider than the conveyer 102.

As will be discussed further hereinbelow, the conveyor 102 can comprise a conveyor belt, roller conveyor, or any other suitable conveyor system known to persons having ordinary skill in the art. In some embodiments, the conveyor 102 is a conveyor belt comprising any suitable material, such as, for example and without limitation, rubber, plastic, metal, or any other material known to persons having ordinary skill in the art to be suitable for working as a conveyor 102. Furthermore, in this embodiment, as the conveyor 102 moves, it conveys the articles 104 in the transport direction 112, as indicated by the arrow. In some embodiments, the conveyor 102 comprises a single conveyor belt. However, persons having ordinary skill in the art will appreciate that the conveyor 102 can comprise two or more smaller conveyor belts acting simultaneously in place of the single conveyor belt illustrated. Additionally, persons having ordinary skill in the art will appreciate that there could be one or more parallel paths that the conveyor belt could conceivably travel along. In the example embodiment shown, a single conveyor belt is shown as a non-limiting example only.

In the embodiment shown in FIG. 1, the article gapping system 100 comprises one or more rollers 106 configured to apply pressure to at least the articles 104 in contact with the one or more rollers 106, thereby ensuring that the articles 104 do not flip or rotate (e.g., in a clockwise direction, relative to FIG. 1, over the fingers 108) when contacting the fingers 108. In embodiments without the one of more rollers 106, when a line of articles 104 (or just one article 104) contacts the fingers 108, the force of the conveyor 102 moving underneath the article 104, along with the force from the fingers 108 stopping the article 104, can cause the article 104 to rotate or flip (e.g., clockwise). By putting the rollers 106 in place, at least one of which is vertically aligned over a position where a leading article 104 contacts, and is stopped at, the fingers 108, the movement of the article 104 along the conveyor 102 is stopped and allows for the article 104, stopped at the fingers 108, to be serialized, for example, by being lasered and/or etched, as will be described below. In some embodiments, a first of the rollers 106 is configured to contact the top of at least the article 104 stopped at the fingers 108. Additionally, a second of the rollers 106 is configured to contact the top of at least the article 104 directly adjacent (e.g., "behind," if the article 104 directly contacting the fingers 108 is "the front") the article 104 contacting the fingers 108. As referred to elsewhere herein, articles 104 stopped at the fingers 108 can be said to be stopped at a first location. In some embodiments, the rollers 106 can be altered, raised, lowered, or otherwise positionally adjusted, replaced, and/or removed entirely in order for the article gapping system 100 to be able to process articles 104 of any of a plurality of different sizes.

The process of article 104 movement and stoppage is described further in detail hereinbelow, including some of the components of the article gapping system 100 used to align the articles 104 relative to the conveyor 102, as well as how such components interact to help align the articles 104 to be oriented parallel with respect to each other. In some embodiments, only one article 104 will be front end registered and, in this case, the edge of such article 104 can be aligned with the fingers 108 contacting the side of such article 104. In this manner, all of the fingers 108 are touching such article 104 at the same time, thereby aligning the article to a desired orientation (e.g., substantially perpendicular) relative to the conveyor 102.

In some embodiments, the fingers 108 comprise two or more elements for stopping articles 104 the article gapping system 100 is configured to process. For example and without limitation, the fingers 108 comprise metal(s), including, for example, steel, aluminum, titanium, iron, combinations and/or alloys thereof, or any other suitable metal, or combination of metals, known to persons having ordinary skill in the art. In some embodiments, the fingers 108 comprise plastic, rubber, wood, combinations thereof, or any other suitable material(s) suitable for stopping the movement of articles 104 along conveyor 102. In some embodiments, the fingers 108 can be attached to a bracket, brace, or other suitable structure configured to lift a leading edge, relative to the direction of travel 112 of the articles 104 along the conveyor 102, of the fingers 108 at least partially above the height of the conveyor 102 and also to lower the leading edge of the fingers 108 to the same height or lower than the conveyor 102. In some embodiments, as will be shown in a different view hereinbelow, the fingers 108 are configured to be laterally spaced apart from one another, for example, in a direction that is at an angle relative to the direction of transport of the articles 104 along the conveyor 102, particularly in a substantially orthogonal orientation relative to the direction of transport of the articles 104 along the conveyor 102. In some embodiments, for example and without limitation, the fingers 108 can be spaced apart with respect to one another by a length greater than the width of the conveyor 102.

In some embodiments, the fingers 108 can be attached to a lifting mechanism 114, for example by a bracket or other suitable structure. In such embodiments, the lifting mechanism 114 is configured to raise and lower the fingers 108 in order to stop the articles 104 (e.g., by raising the fingers 108) and then allow the articles 104 to pass along the conveyor 102 (e.g., by lowering the fingers 108) at specific times to produce the desired gap distance between the articles 104. In the embodiment shown, the lifting mechanism 114 comprises a four-bar linkage system. In some embodiments of the present disclosure, the lifting mechanism 114 comprises arms and a motor 116 or other suitable device. In some embodiments, the motor 116 can be an intelligent motor drive, such as, for example and without limitation, a stepper or servo motor. The lifting mechanism 114, in some embodiments, can comprise a motor 116, engine, mechanical device, or other suitable device or system. The motor 116 can be connected to metal arms, a metal brace or bracket, or other suitable device, which is then connected or attached to the fingers 108. In some embodiments, the arms, metal brace or bracket can be pivotably attached to the motor 116 or other device. In some embodiments, as the motor 116, engine, or other suitable device operates, it is configured to lift and/or lower the arms or bracket, which then lifts and/or lowers the fingers 108 as well. In some embodiments, the fingers 108 are raised and lowered in a smooth fashion such that articles 104 are not significantly disturbed or thrown off the fingers 108.

In some embodiments of the present disclosure, the fingers 108 are controlled by one or more PLCs using at least three sensors 118A, 118B, 118C. In some embodiments, the sensors, 118A, 118B, 118C, can comprise optical sensors, photocell sensors, proximity detectors, infrared sensors, or any appropriate sensor known to those having ordinary skill in the art that can sense the presence of an article 104. In this embodiment, a first sensor 118A is used to determine if there is more than one article 104 waiting to enter and pass by the fingers 108. When a second article 104 is behind a first article 104 passing over the fingers 108 in the retracted position, the second article 104 drives the first article 104 forward in the transport direction 112 when the first article 104 is over the fingers 108. This ensures that each of the articles 104 moves over the fingers 108 in a predictable and repeatable amount of time to ensure smooth operation. When this drive force is missing, occasionally, an article 104 will pause on the fingers 108, preventing the proper size article gap 120 (described hereinbelow) from being created.

In some embodiments, the article gapping system 100 can comprise a paddle 110 configured to stop and controllably release an article 104 to move along the conveyor 102 again. In the embodiments shown in the figures, the paddle 110 is spaced apart from the fingers 108 and an article 104 moving in the transport direction 112 will reach the paddle 110 after it has moved past the fingers 108. Any article 104 stopped at the paddle 110 can be said to be stopped at a second location. The paddle 110 can be configured to raise and lower and to release and stop articles 104 as they reach the paddle 110. The paddle 110 can be comprised of any suitable pivotably connected device that is used to stop the article 104. For example and without limitation, the paddle 110 can comprise plastic, metal, wood, or any other suitable substance that can be used to stop and release the articles 104. For example and without limitation, the paddle 110 can comprise a hard plastic or metal that has minimal flex, bend, or give.

If the article gap 120 is too small (e.g. articles 104 bunched together such that when the paddle 110 lowers down, the tip of the paddle 110 lands on top of an article 104 and gets jammed), the paddle 110 could jam or push the delayed article 104 into the subsequent article 104 creating an article alignment problem for scanning later on (i.e., if the article 104 is not properly aligned, it will not be properly scanned). A second sensor 118B is provided, in some embodiments, and can be configured to determine when there is an article 104 waiting to enter the article gapping system 100. In the embodiment shown, a third sensor 118C is provided and configured to signal the fingers 108 to rise above the height of the conveyor 102.

Furthermore, in some embodiments, the paddle 110 can comprise aluminum, steel, iron, or other suitable metal or metallic alloy. In some embodiments, the paddle 110 can be operated by a controller (not shown), such as, for example, a programmable logic controller (PLC), or any other suitable device. In some embodiments, the paddle 110 can be operated by a timer or other device that may or may not be a part of the PLC. In some embodiments the paddle 110 can be operated by a motor 116, or other suitable device, connected to the fingers 108, the paddle 110, and/or the PLC, such that the fingers 108 and paddle 110 operate in a synchronous manner, but not necessarily at the same time. For example, there could be a delay between when the fingers 108 lower and the paddle 110 raises, both allowing a different article 104 to pass over/under them respectively.

Moreover, in some embodiments, in addition to first sensor 118A, second sensor 118B, and third sensor 118C, the article gapping system 100 can comprise fourth sensor 118D and fifth sensor 118E, which are configured to sense or detect the presence of the article 104 on approach to the paddle 110. In some embodiments, the sensors, 118D and/or 118E, can comprise optical sensors, photocell sensors, proximity detectors, infrared sensors, or any appropriate sensor types known to those having ordinary skill in the art that can sense the presence of an article 104. In some embodiments, the fourth sensor 118D and fifth sensor 118E can be configured to send a signal to a controller or other control device for the paddle 110 that the article 104 is approaching the paddle 110. From there, the controller for the paddle 110 can raise and/or lower the paddle 110 according to the information transmitted by the fourth sensor 118D and fifth sensor 118E. In some other embodiments, the fourth sensor 118D and/or fifth sensor 118E are omitted and the paddle 110 is configured to be raised and/or lowered based on a timing system or timer. In some embodiments, the article gapping system 100 comprises a single motor 116. In other embodiments, the article gapping system 100 comprises more than one motor 116, including, for example and without limitation, two stepper motors, a first motor for operating the fingers 108 and a second motor for operating the paddle 110. In such embodiments, each of the motors can be operated based on a PLC or other device comprising one or more processors, computer readable medium, and/or executable instructions. In some embodiments, the single motor 116 is configured to operate all of the components of the article gapping system 100 that requires a motor for operation, including, for example and without limitation, the conveyor 102, the rollers 106, the lifting mechanism 114, the paddle 110, and/or any other mechanism included in the article gapping system 100.

The timing of the fingers 108 and the paddle 110 lowering and raising is based on the first sensor 118A, second sensor 118B, third sensor 118C, fourth sensor 118D, and fifth sensor 118E and the precise motion profiles of the fingers 108 and paddle 110 mechanisms. Persons having ordinary skill in the art will appreciate that the article gap 120 (described below) is, at least mostly, based on the motion and timing of the fingers 108 raising and lowering and the front-end registering, or aligning the articles 104 to be substantially perpendicular to the transport direction 112, of the articles 104 is performed by the motion and timing of the paddle 110. In some embodiments, the PLC and motor 116 can be separate devices. In some embodiments, the PLC can be incorporated into the housing of the motor 116 and/or integral to the motor.

FIG. 2A illustrates the article gapping system 100 from FIG. 1, showing a plurality of articles 104 lined up and stopped at the fingers 108, or, in other words, at the first stop location. Three articles are specifically designated in this figure, as, first article A, second article B, and third article C. First article A is positioned such that a first portion of first article A is partially on the fingers 108 and a second portion of first article A is partially on the conveyor 102. Prior to the first article A being in this position, first article A was in an identical position as second article B is presently shown. In order to release the first article A from the first stopping location (e.g., stopped at the fingers 108) the lifting mechanism 114, via the motor 116, lowered the fingers 108 to a height equal to or lower than the conveyor 102, allowing the first article A to move along the transport direction 112 on the conveyor 102 to the current position of first article A shown in FIG. 2A. During the time that the first article A moved over the fingers 108, the fingers 108 have raised up again, with at least a portion of the first article A still contacting the fingers 108 and the remaining portion of first article A still on the conveyor 102 such that the fingers 108 are able to stop the second article B and the first article A is able to continue moving along the path. As shown in FIG. 2A, the first article A is slightly at an incline with respect to the conveyor 102, the incline caused by the fingers 108, and a surface of the first article A is not fully contacting the conveyor 102.

In this particular view, although it is difficult to see, second article B is covering up or blocking the second sensor 118B, causing a registration timer in the motor 116 or a PLC to start. The timer allows a skewed article 104 such as, for example second article B to turn by being driven by the conveyor 102 to contact at least two fingers 108 and thus become front-end registered. After the registration timer runs out, the motor 116 or the PLC checks the first sensor 118A to see if another article 104 is behind the second article B. If there is another article 104 such as, for example and without limitation, third article C, the fingers 108 will be lowered to allow second article B to begin moving on the conveyor 102. At the same time, while the fingers 108 are being lowered, a cycle timer is started in the motor 116 or PLC that is used to define the article gap 120 to be created. If there is no other article 104 behind the second article B, (e.g., the articles 104, including third article C, after second article B are not present) the article gapping system 100 will wait for a certain amount of time for another article 104, such as for example, third article C, to arrive in behind the second article B. If another article 104 does not arrive in behind the second article B during the amount of time given, the fingers 108 will lower to let the second article B through. However, in such a case, the fingers 108 will stay down since there is not another article 104 behind the second article B to provide drive. The fingers 108 will remain down until another article 104 moving along the conveyor 102 blocks or triggers the first sensor 118A. This ensures that the fingers 108 can move back to the deployed position in time to prevent another article 104 from going through the article gapping system 100 prematurely without being front-end registered by the fingers 108, first.

As described above, in some embodiments, the fingers 108 are configured to be raised and lowered smoothly such that the article 104 moving over the fingers 108 is not flipped, or significantly disturbed other than being inclined and/or lifted slightly relative to the conveyor 102. The fingers 108 lower to a height below the conveyor 102 to allow the articles 104 to pass over them and then rise smoothly to stop the next article 104 in line on the conveyor 102. When the fingers 108 lower and/or rise, there is at least a portion of an article 104, carton, package, or good that always touches the conveyor 102. This is achieved by adapting the size of the fingers 108 or the timing in which the fingers 108 are raised/lowered based on the size of the article 104 being transported on the conveyor 102. In some embodiments, this is necessary to ensure that the velocity, $V_C$, of the leading edge of the article 104, at the point of separation, is the same as the velocity, $V_B$, of the conveyor 102.

As illustrated in FIG. 2A, second article B and third article C are stopped by the fingers 108 and are contacted on the top surface thereof by the rollers 106 such that the second article B and third article C are not flipped about by the conveyor 102 moving underneath them. In some embodiments, the articles 104 can be fed into the article gapping system 100, toward the fingers 108, with random, different, or approximately the same spacing between them, or in a line contacting each other.

Figure 2B:
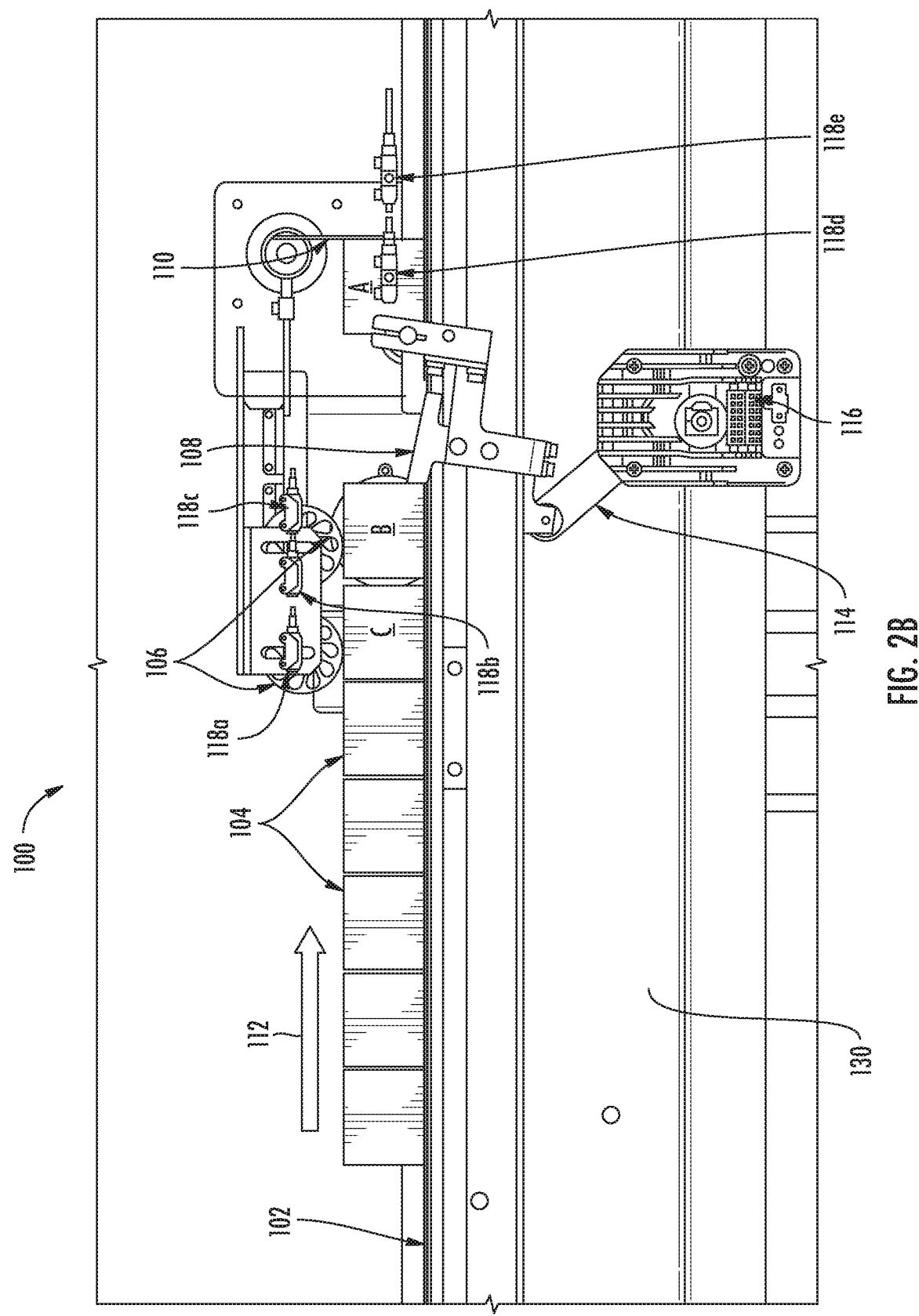

FIG. 2B illustrates the same features as FIG. 2A, except here, first article A is stopped at the paddle 110 (e.g., the second stopping position), which is shown in a stop position in this figure, and the second article B is stopped at the fingers 108 (e.g., the first stopping position), which are shown in the deployed position. As shown in FIGS. 2A and 2B, in some embodiments, while second article B is stopped at the fingers 108, the conveyor 102 continues to move along the conveying path at a constant velocity, as evidenced by the first article A continuing to move along until it contacts the paddle 110 in FIG. 2B. In some embodiments, first article A continues to move along the conveyor 102 at velocity $V_C$, which is the same as the velocity, $V_B$, of the conveyor 102, until the first article A is stopped at the second stopping location, the paddle 110. At this point, both the second article B and the first article A are stopped with a velocity of 0 m/s, while the conveyor 102 continues to move in the transport direction 112 at velocity $V_B$ m/s. While second article B is stopped at the fingers 108, a laser, etching device, printing device, or other suitable device etches, engraves, and/or prints on the second article B indicia or other marking on the article 104. The laser or other suitable device is better shown in FIG. 3A. In this side view of FIG. 2B, the laser is behind second article B.

Figure 2C:
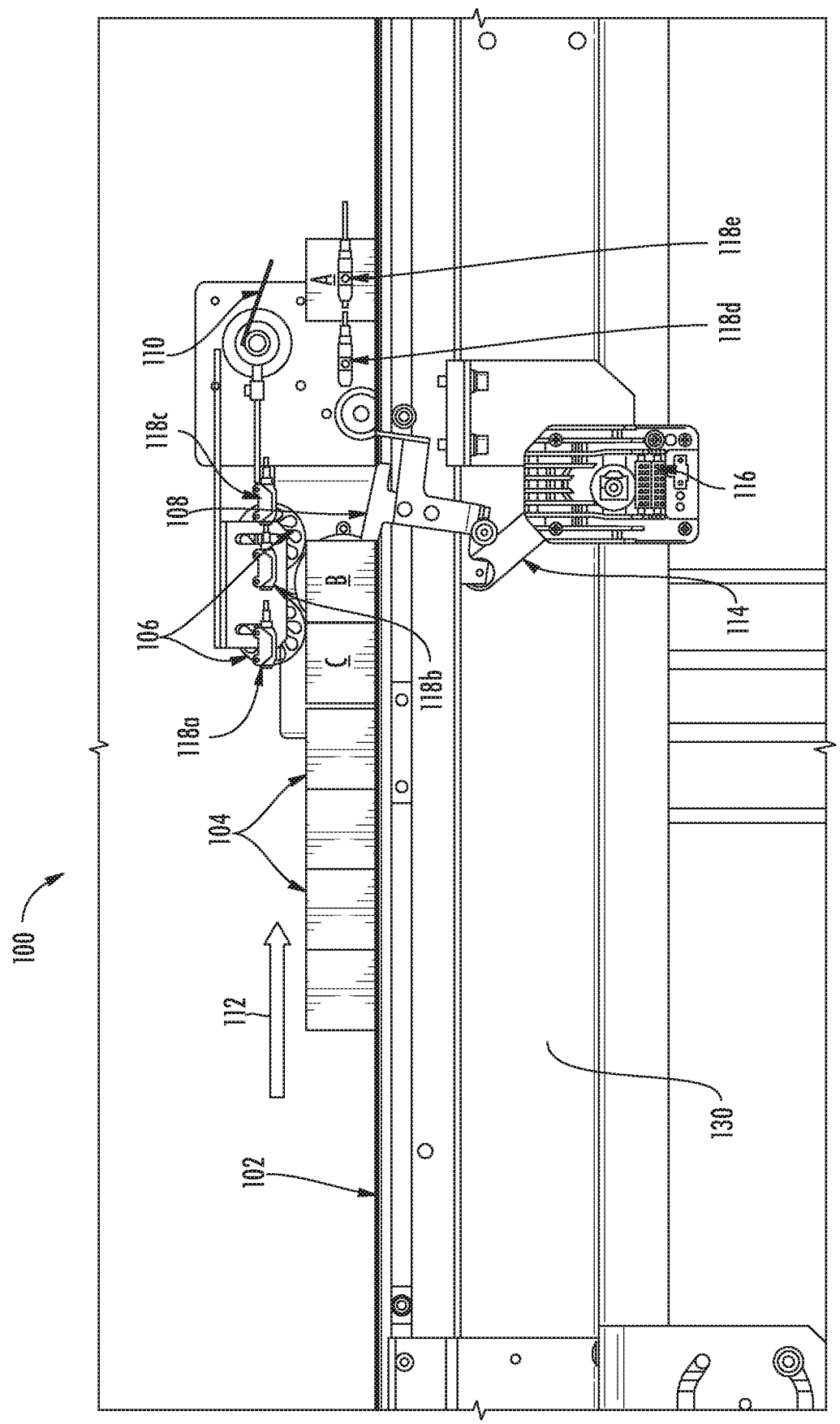

FIG. 2C illustrates that, in some embodiments of the present disclosure, at a time after the first article A has been stopped at the paddle 110, either by sensing the presence of the first article A by the fourth sensor 118D shown or by a timer, the paddle 110 is raised smoothly to a release position to allow the first article A to start moving again along the conveyor 102 in the transport direction 112. As discussed above, the paddle 110 is configured to operate based on a motor 116 and/or a PLC. The paddle 110 can be configured, in some embodiments, to operate based on the fourth sensor 118D and/or the fifth sensor 118E. In some embodiments, when one end of a skewed article 104 touches the paddle 110 and blocks the fourth sensor 118D, a second registration timer starts. This allows the article 104 to be front-end registered, such as that illustrated in FIG. 2B above with respect to the first article A. In some embodiments, once the first article A has been front-end registered, the paddle 110 will rise to a release position. Persons having ordinary skill in the art will appreciate that the paddle 110 is raised smoothly enough to allow the first article A to smoothly accelerate to have the same velocity $V_B$ of the conveyor 102 without slipping on the conveyor 102. Furthermore, the raising of the paddle 110 is configured so as to not affect the position or alignment of the first article A as the first article A passes underneath the raised paddle 110. Additionally, second article B remains stopped at the first stopping point by the fingers 108. In some embodiments, once the first article A goes under the paddle 110, the fifth sensor 118E is blocked. This does two things: it triggers the paddle 110 to begin lowering to the stop position, and it permits the release of the second article B behind first article A (e.g., it allows the fingers 108 to lower tot eh retracted position). In some embodiments, once the fifth sensor 118E becomes unblocked, the trailing edge of first article A has been identified and the paddle 110 lowers. In some embodiments, the paddle 110 lowers on the trailing edge of first article A so that fifth sensor 118E will work with any article 104 width.

Referring to FIG. 2D, once the first article A is released by the paddle 110, the fingers 108 are lowered to the retracted position by the lifting mechanism 114 and all of the articles 104 begin moving at the velocity $V_B$ of the conveyor 102. As shown in FIG. 2D, second article B is entirely on the conveyor 102 as the fingers 108 are lowered to the retracted position, allowing the second article B to start moving. Furthermore, third article C moves towards the fingers 108. However, as shown, the edge of third article C has not reached the fingers 108 yet. The fingers 108 are raised between FIG. 2D and FIG. 2E to stop the third article C before it can move any further. As the fingers 108 are lowered, so is the paddle 110. In FIG. 2C, the paddle 110 is raised such that it is almost parallel to the conveyor 102. However, in FIG. 2D, the paddle 110 is shown in movement, lowering to become perpendicular to the conveyor 102.

Also shown in FIG. 2D is first article A and fourth article D. An important aspect of the present disclosure is that first article A and fourth article D are separated by an article gap 120, which can be defined as either or both of a predetermined time and distance. Some embodiments are configured such that, after leaving the paddle 110, when there is more than one article 104 passing through the system 100, the articles 104 are spaced apart by the same length. In other words, the article gap 120 between each article 104 after passing the paddle 110 is substantially identical. In some embodiments, the article gap 120 can be based on the throughput of the article gapping system 100, the speed of the conveyor 102, and/or the size of the articles 104 traveling through the system 100. For example and without limitation, in some embodiments, the system 100 can be configured to front-end register about 100 articles 104 per minute, or register one article 104 in 0.6 seconds. However, those of ordinary skill in the art will appreciate that the system 100 can be configured to handle any number of articles 104, but less than 100 and greater than 100. In some embodiments, the system 100 can be configured to have a conveyor 102 velocity $V_B$ of about 10 inches/second (or 10 in/sec). In such an embodiment, this would mean that a leading edge to leading edge distance between of the articles 104 would be about 6 inches. In some embodiments, the velocity of the conveyor 102 can be configured to be lower or higher than 10 in/sec. The higher the velocity of the conveyor 102, the higher the leading edge to leading edge distance. With that being said, the article gap 120 is determined based on the leading edge distance minus the width of the article 104 in the transport direction 112. For example and without limitation, with a conveyor 102 velocity $V_B$ of about 10 in/sec and a throughput of the system 100 at about 100 articles 104 per minute, the article gap 120 will be about 6 in-X, where X is the width of the article 104 in the transport direction. For example and without limitation, if an article 104 had a width in the transport direction 112 of about 2 in, the article gap 120 would be between about 3.8 in and 4.3 in in length. More specifically, in some embodiments, the article gap 120 would be about 4 in. Again, those of ordinary skill in the art will appreciate that the length of the article gap 120 can vary or be adjusted above and below 4 in, depending on many factors, including the speed or velocity of the conveyor 102, the throughput of the system 100, and the various dimensions of the articles 104, in particular the width of the articles 104 in the transport direction. The article gap 120 can be adjusted and varied depending on the what needs to be done with the articles 104 after they are front-end registered (i.e., if they need to be scanned, or otherwise processed). In that case, the specifications of the scanner 128 or other device that needs to process the articles 104 can determine the minimum article gap 120.

Furthermore, the alignment of the articles 104, after passing the paddle 110, are substantially parallel with respect to each other. Once the fingers 108 have been lowered, as shown in FIG. 2D, the second article B will start moving down the conveyor 102 over the lowered fingers 108. In some embodiments, once the leading edge of the second article B blocks the third sensor 118C, the fingers 108 raise with the second article B still on them, as shown in FIG. 2E. In some embodiments, a width of the conveyor 102 (i.e., the conveyor belt(s), rollers, etc.) can be altered, changed, or otherwise adjusted to accommodate any size article 104.

Referring to FIG. 2E, first article A has completely passed from the paddle 110 and the paddle 110 has completely lowered down, ready to stop the second article B. The second article B is currently raised by the fingers 108 at a rear portion of the second article B. Persons having ordinary skill in the art will appreciate that, in some embodiments, the placement of the third sensor 118C is very critical in triggering the fingers 108 to rise at the appropriate time to stop the third article C and to cause the appropriate smooth lift. In some embodiments, the third sensor 118C is positioned such that the center of mass of, for example, the second article B, is over the fingers 108 before being raised, but not too far past the edge of the fingers 108 because the fingers 108 need to rise in time to stop the next article 104 transported along the conveyor 102 (e.g., third article C). In some embodiments, the fingers 108 are not lowered until the cycle timer discussed above has elapsed and the previous article 104 has triggered fifth sensor 118E to ensure that the minimum gap necessary has been created. Third article C is now stopped by the fingers 108 and is being etched or engraved in some embodiments by the laser 124. The third article C also has at least one roller 106 contacting the top of it, keeping the third article C from rotating or flipping. In this figure, second article B is now travelling at the same velocity, $V_B$, as the conveyor 102, as is first article A. Persons having ordinary skill in the art will appreciate that the separation of the articles 104 occur at two points: the fingers 108 and then again at the paddle 110.

Figure 2F:
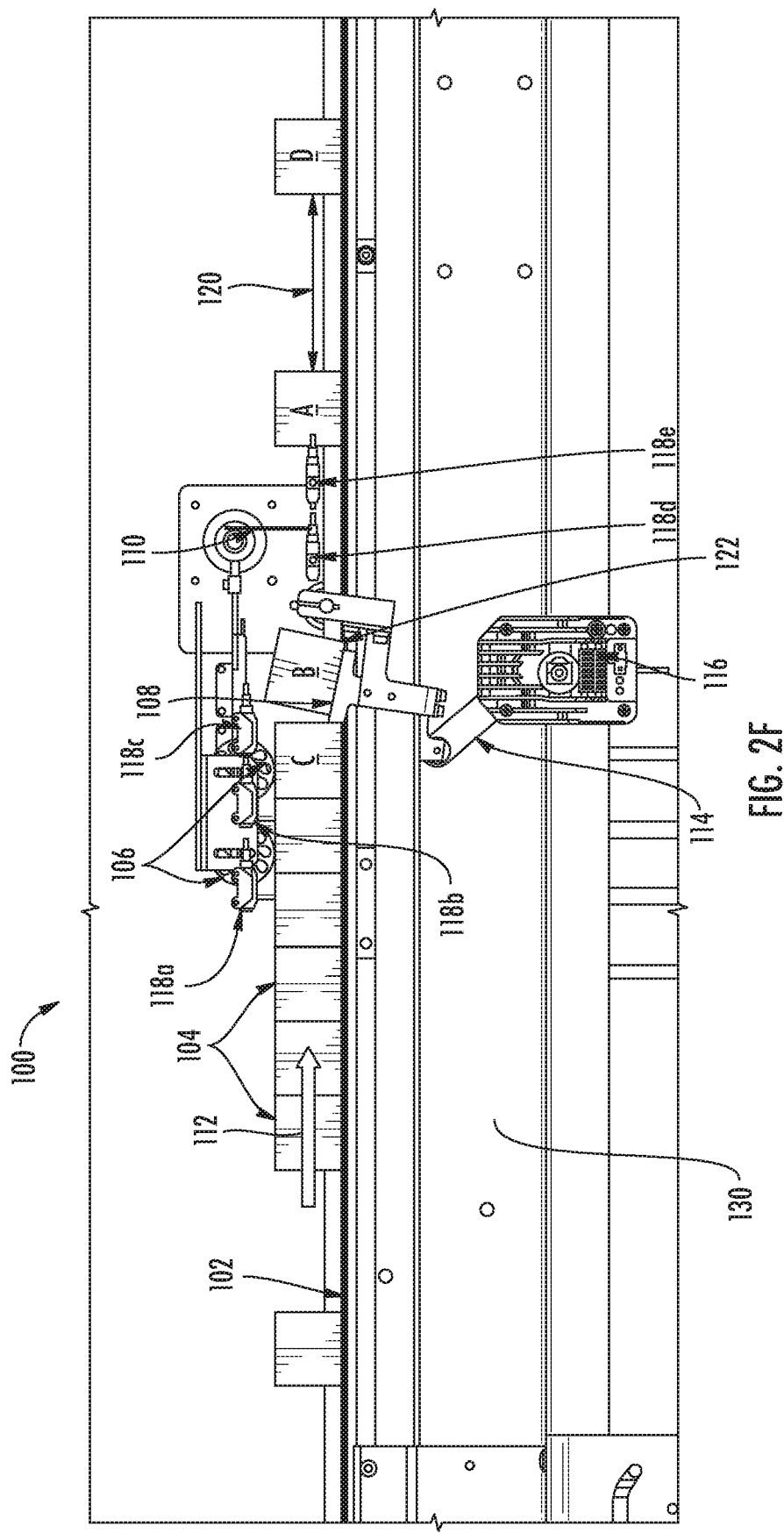

FIG. 2F is substantially the same as FIG. 2E, except that it includes first article A and fourth article D and shows the article gap 120 length again between first article A and fourth article D. Additionally, persons having ordinary skill in the art will appreciate that, as the second article B is transported down the backside of the fingers 108, there is no guarantee that it will remain front-end registered. In some embodiments, the paddle 110 provides the extra registration step discussed above to ensure all of the articles 104 are front-end registered. Persons having ordinary skill in the art will appreciate that according to some embodiments of the present disclosure, the process of front-end registering, as described, will continue from this stage until all of the articles 104 are front-end registered.

Furthermore, persons having ordinary skill in the art will appreciate that some embodiments of the present disclosure can have a distance between the fingers 108 and the paddle 110 to accommodate articles 104 of any size or dimension.

Figure 3A:
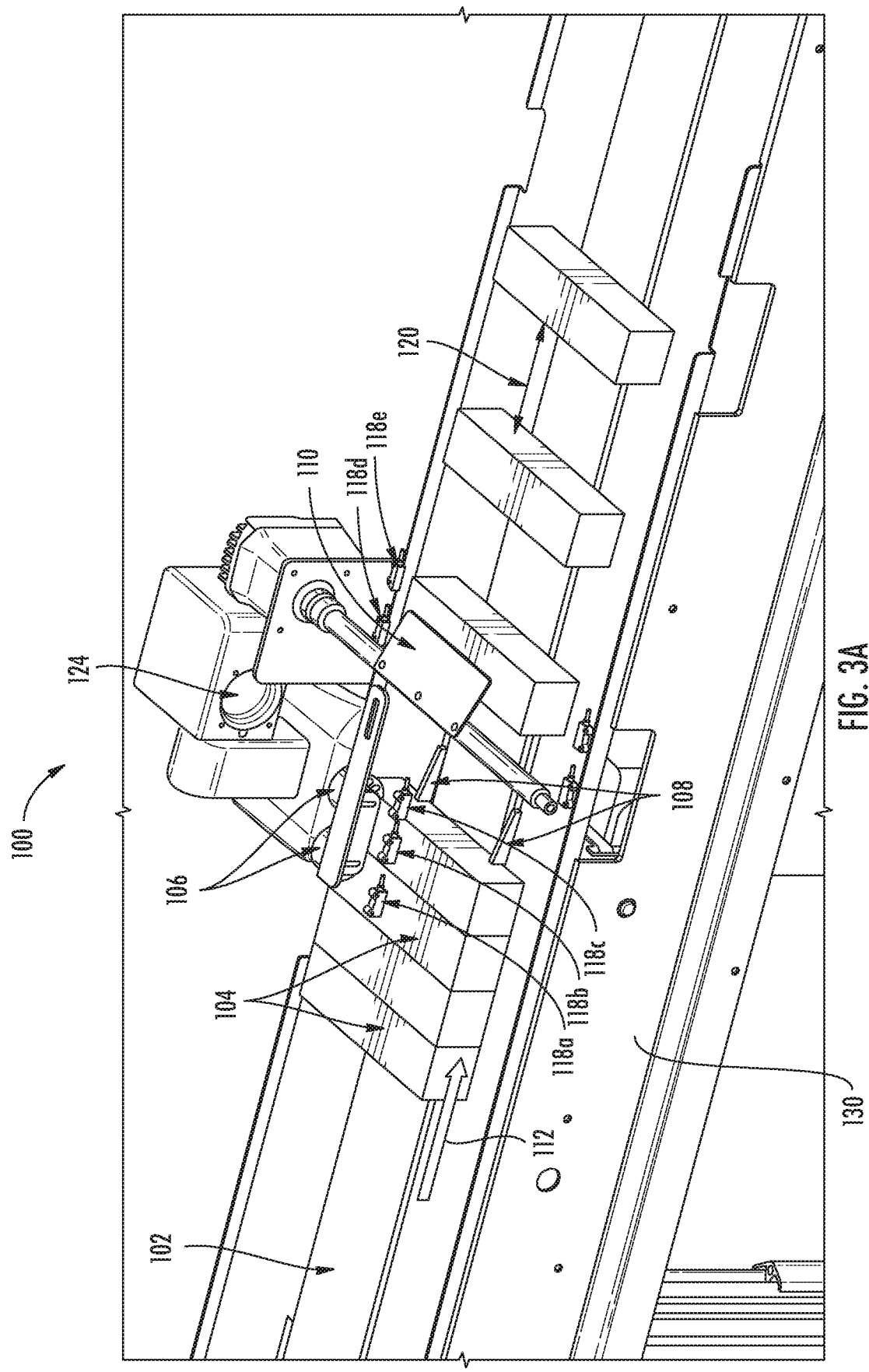

Referring to FIG. 3A, example embodiments of the present disclosure can also comprise a laser 124 or other suitable device for engraving or etching indicia or unique identifiers on the articles 104. FIG. 3A shows the laser 124 or other device that performs the engraving, etching, or printing. The engraving, etching, or printing can be applied directly on the surface of the article 124 in some embodiments. As shown in the figure, the laser 124 is in line with the article 104 that is stopped at the fingers 108 (e.g., the first stop location) and is configured to laser the article 104 that is stopped. Moreover, as shown in FIG. 3B, according to some embodiments, the system can comprise one or more rollers 106, including for example four rollers 106 for better stability. Note, in this figure, first sensor 118a, second sensor 118b, and third sensor 118c are not visible. However, ordinarily, they would be between the two sets of two rollers 106.

Figure 3C:
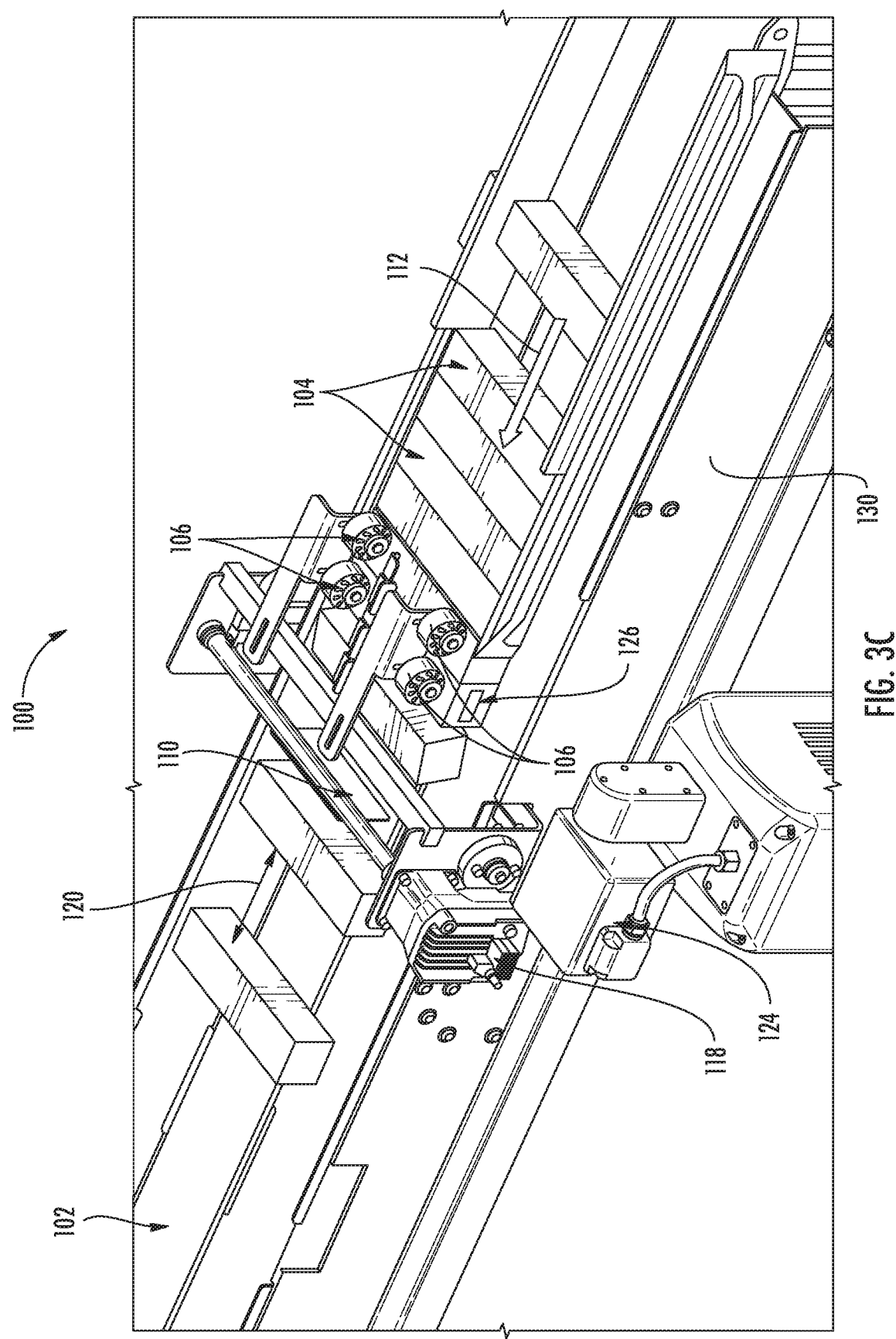
Figure 9:
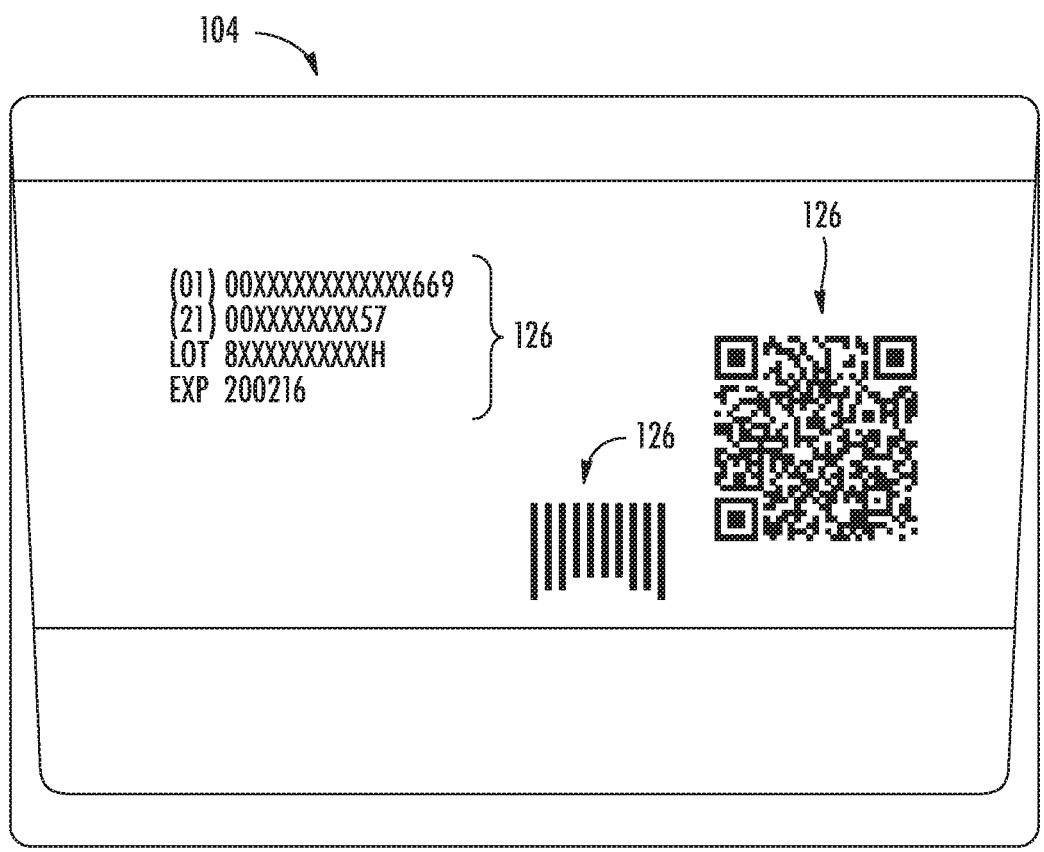
FIG. 9 is an image of example indicia that can be etched, for example, by a laser, into some or all of the cartons, boxes, or packages that pass adjacent to the laser.

Referring to FIG. 3C, the article 104 stopped at the fingers 108 can have an indicia area 126 on it as shown after the laser 124, etching device, or printer has placed indicia 126 on the article. FIG. 9 is an example embodiment of indicia 126 etched, printed, or placed on the article 104. The indicia 126 can comprise for example, a label comprising a Global Trade Identification Number (GTIN) number, a serial number, an expiration date, a QR code, or any other suitable indicia 126. In some embodiments of the present disclosure, the indicia 126 are unique to the article 104 to which the indicia 126 are applied. In further embodiments of the present disclosure, the indicia 126 information can be saved in a database or other suitable format to be used for later lookup or searching.

Figure 4A:
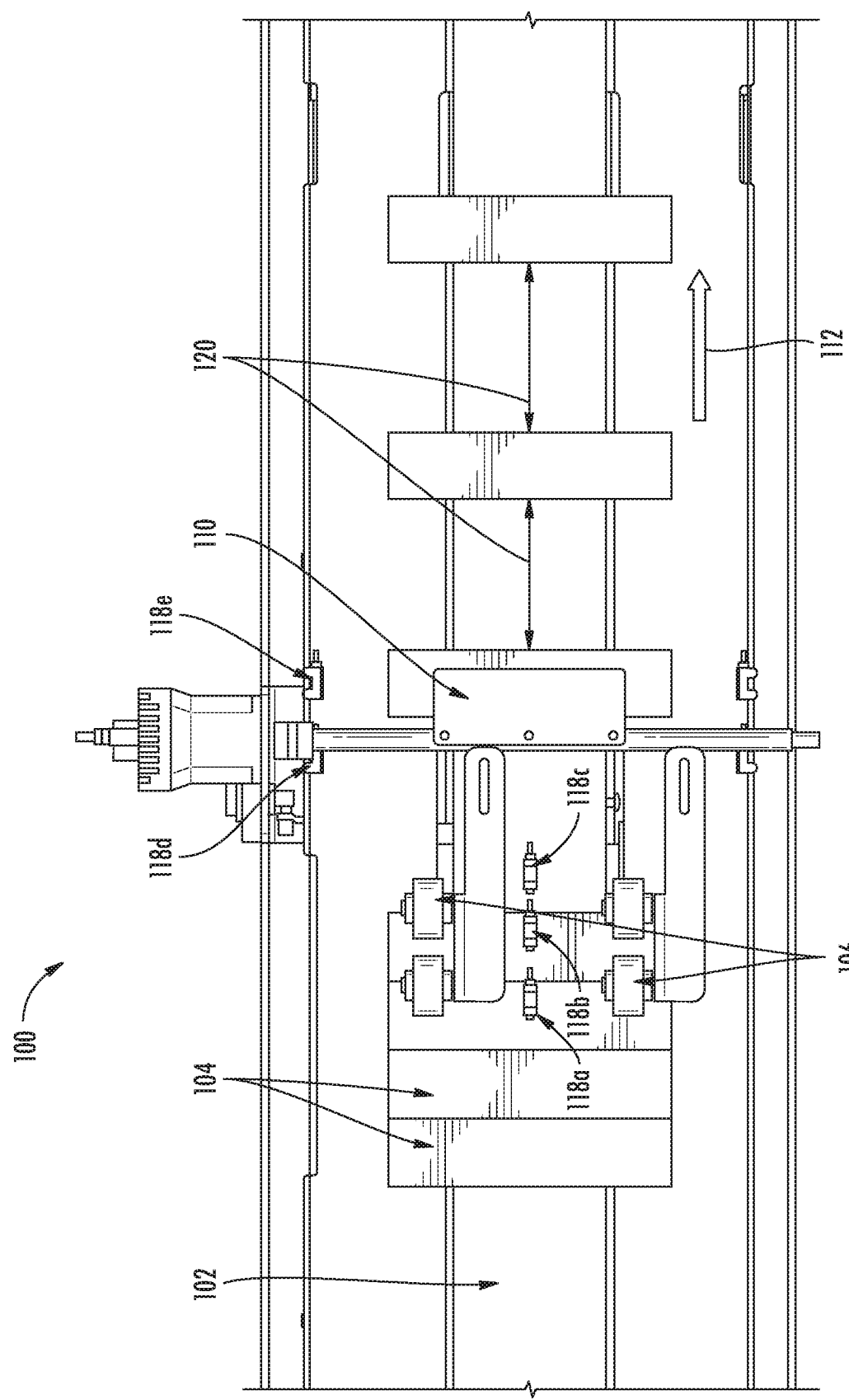
FIGS. 4A and 4B are top views of the system shown in FIG. 1 at various stages of operation according to an example embodiment of a method for article and/or package processing.
Figure 4B:
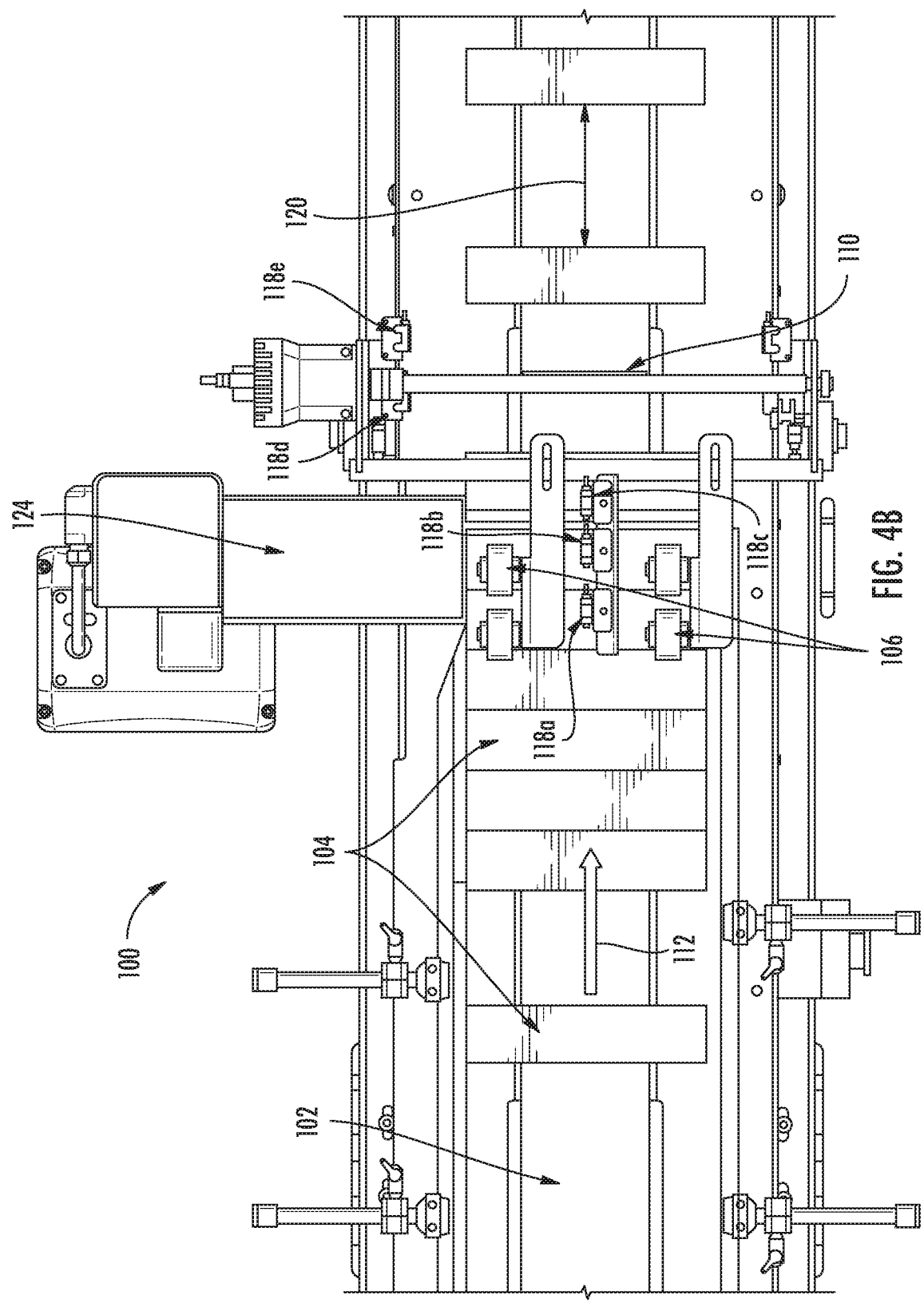

FIG. 4A illustrates a top view of the article gapping system 100 showing most of the features discussed above. In some embodiments, the paddle 110 can be configured such that it can be raised by the motor 116 or other suitable device, as discussed above. As shown in FIG. 4A, the paddle 110 can be pivotably affixed to a rod or other object of the article gapping system 100 that is turned by the motor 116, lifting the paddle 110 to allow the article 104 to move forward. FIG. 4B illustrates a top view of the article gapping system 100, very close to that shown in FIG. 4A. Additionally, FIG. 4B shows where the laser 124 is located in this context and it also shows the paddle 110 down, getting ready to stop the next article 104.

FIG. 5 illustrates another perspective view of the article gapping system 100 as disclosed hereinabove. In particular, FIG. 5 highlights how the fingers 108 are spaced apart with respect to one another by at least the same width as the width of the conveyor 102. In some embodiments, the distance between the two fingers 108 can be altered, based on the bracket they are attached to, in order to fit any dimension article 104 that can fit on the conveyor 102.

FIG. 6 illustrates a perspective view of an underside of the article gapping system 100 depicting a different perspective than the other figures hereinabove. As illustrated in the figure, the article gapping system 100 is supported by a frame 130. The frame 130 can be made from a metal or any suitable substance that can hold up and support the article gapping system 100. In some embodiments, the frame 130 can lower and raise the entire conveyor 102 in order to fit different sized articles 104. As shown in the figure, the lifting mechanism 114 can comprise an arm connected between the bracket and connected to the fingers 108, and the motor 116. As the motor 116 operates, the lifting mechanism 114 goes up and down to make the fingers 108 raise and lower to the various positions discussed above.

Figure 7:
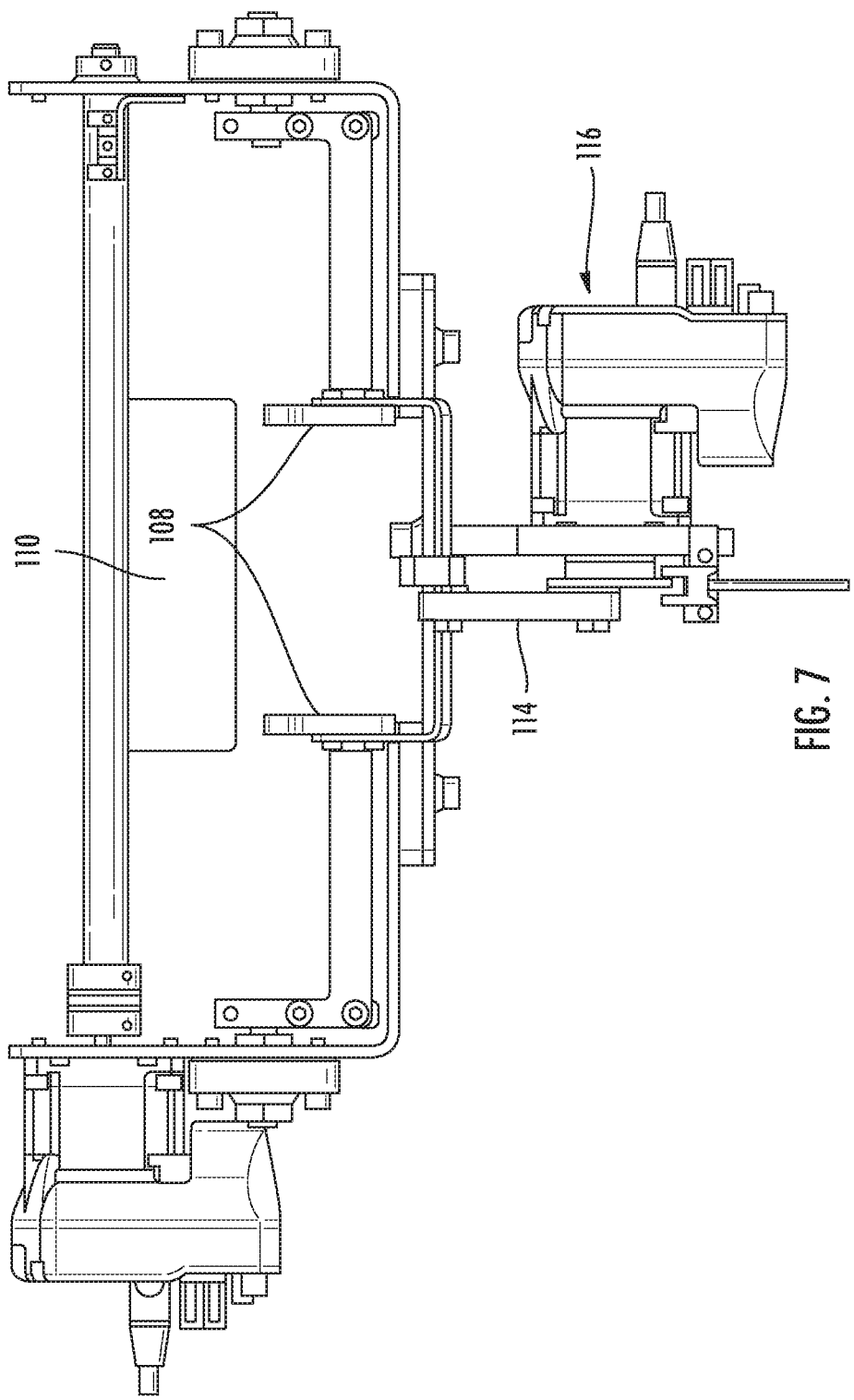
FIG. 7 is a front isolated view of portions of the system shown in FIG. 1 to better visualize the features of the system.

FIG. 7 illustrates a schematic view of several components of the article gapping system 100, including the fingers 108, the paddle 110, the motor 116, and the lifting mechanism 114. This view helps to further illustrate how these components are connected within the article gapping system 100.

Figure 8:
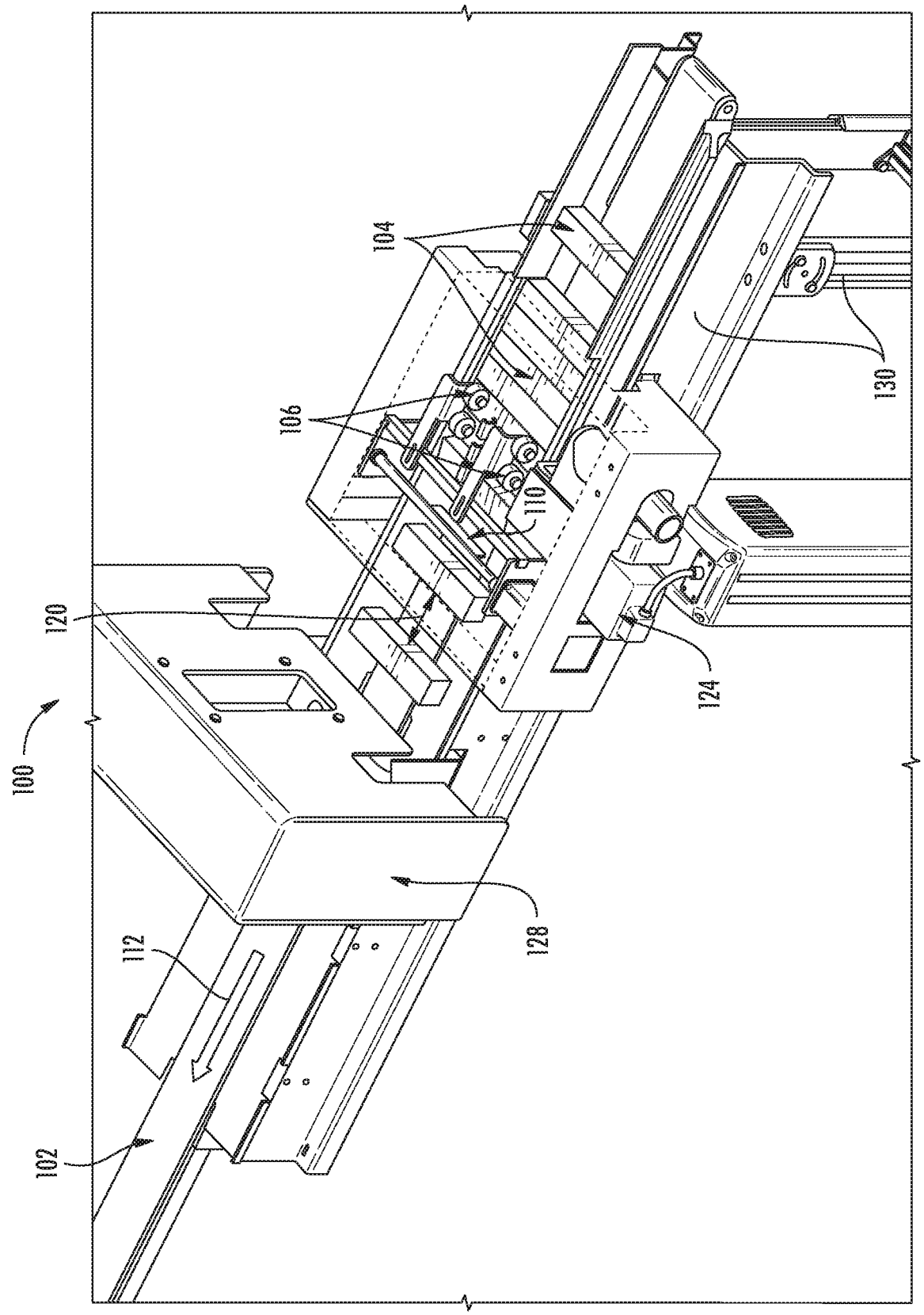
FIG. 8 is a perspective view of an embodiment of the system shown in FIG. 1, including a scanner and other components that were omitted from previous figures for clarity.

FIG. 8 illustrates another view of the article gapping system 100 and includes a scanner 128 beyond the paddle 110 in the transport direction 112. In some embodiments, the scanner 128 can comprise sensors, an x-ray scanner, cameras, thermal imaging devices, or other suitable scanning devices. In some embodiments, the scanner 128 is configured to inspect the articles 104 as they pass through it. In some embodiments, after the articles 104 leave the paddle 110, they are scanned in the scanner 128. In some embodiments, the scanning process can include scanning the indicia 126 on the article 104, x-ray scanning, or other suitable scanning for security purposes, quality control purposes, or the like.

FIG. 9 illustrates example indicia 126 that were printed or etched onto an example article 104. The indicia 126 can comprise for example and without limitation, a label comprising a Global Trade Identification Number (GTIN) number, a serial number, an expiration date, a QR code, a lot number, or any other suitable indicia 126. In some embodiments of the present disclosure, the indicia 126 are unique to the article 104 onto which the indicia 126 is applied. In further embodiments of the present disclosure, the indicia 126 information can be saved in a database or other suitable format to be used for later lookup or searching.

Persons having ordinary skill in the art will appreciate that the systems, devices, and methods described herein can be scaled or be made scalable for any use or purpose.

While the subject matter has been described herein with reference to specific aspects, features, and illustrative embodiments, it will be appreciated that the utility of the subject matter is not thus limited, but rather extends to and encompasses numerous other variations, modifications, and alternative embodiments, as will suggest themselves to persons having ordinary skill in the field of the present subject matter, based on the disclosure herein.

Various combinations and sub-combinations of the structures and methods described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications, and alternative embodiments, within its scope and including equivalents of the claimed features.

What is claimed is:

1. A method for article processing, the method comprising:
   advancing, using a conveyor, a first article along a conveying path;
   stopping, by actuating one or more fingers into a deployed position, the first article at a first stop location along the conveying path, the one or more fingers being located at, or adjacent to, the first stop location;
   releasing, by actuating the one or more fingers into a retracted position, the first article from the first stop location;
   advancing, using the conveyor, the first article along the conveying path from the first stop location to a second stop location;
   stopping, by actuating one or more paddles into a lowered position, the first article at the second stop location, the one or more paddles being located at, or adjacent to, the second stop location;
   releasing, by actuating the one or more paddles into a raised position, the first article from the second stop location;
   advancing, using the conveyor, the first article along the conveying path from the second stop location;
   advancing, using the conveyor, a second article along the conveying path to a first position;
   stopping, by actuating the one or more fingers into the deployed position, the second article at the first stop location;
   releasing, by actuating the one or more fingers into the retracted position, the second article from the first stop location;
   advancing, using the conveyor, the second article along the conveying path from the first stop location to the second stop location;
   stopping, by actuating the one or more paddles into the lowered position, the second article at the second stop location;
   releasing, by actuating the one or more paddles into the raised position, the second article from the second stop location; and
   advancing, using the conveyor, the second article along the conveying path from the second stop location;
   wherein the second article is released such that the second article is separated along the conveying path from the first article by a gap; and
   wherein, in the deployed position, the one or more fingers extend above a surface of the conveyor at a height sufficient to stop movement of the first and second articles moving along the conveying path at the first stop location and, in the retracted position, the one or more fingers are retracted to a same height as, or below the surface of, the conveyor so that the first and second articles pass over the one or more fingers at the first stop location.

2. The method of claim 1, wherein the one or more fingers comprise at least two fingers that are movable to elevate at least a portion of an article.

3. The method of claim 1, wherein the conveyor comprises one or more conveying belts.

4. The method of claim 3, wherein the one or more conveying belts continue moving when the first article is in the first stop location and when the second article is in the first stop location.

5. The method of claim 1, wherein the one or more paddles are movable and/or pivotable between the lowered position, in which the one or more paddles obstruct, at least partially, the conveying path to stop movement of the first and second articles along the conveying path at the second stop location, and a raised position, in which the one or more paddles do not obstruct the conveying path at the second stop location.

6. The method of claim 1, comprising applying indicia to the first article while the first article is stopped at the first stop location and to the second article while the second article is stopped at the first stop location.

7. The method of claim 6, wherein comprising applying indicia to the first article comprises using a laser to engrave data on the first article.

8. The method of claim 1, comprising advancing the second article along the conveying path to contact and/or abut the first article while the first article is stopped at the first stop location.

9. The method of claim 1, further comprising applying pressure to the first article with one or more rollers while the first article is stopped at the first stop location.

10. The method of claim 1, wherein the gap is determined by either or both of a predetermined time and distance between when the first and second articles are released from the second stop location.

11. The method of claim 1, comprising:
detecting a presence of the first article in the second stop location; and
releasing the first article from the second stop location when the presence of the first article is detected at the second stop location.

12. The method of claim 1, comprising front-end registering, using the one or more fingers, the first and second articles when the first and second articles are present at the first stop location.

13. The method of claim 1, comprising stabilizing the first article at the first stop location on at least three sides of the first article.

14. The method of claim 1, comprising advancing the first article from the first stop location and elevating only a first portion of, and not all of, the first article.

15. The method of claim 14, wherein at least a second portion of the first article maintains contact with the conveyor.

16. The method of claim 1, wherein the first and second articles are cartons or boxes.

17. The method of claim 1, wherein the second article is released from the first stop location at a time corresponding to when the first article is released from the second stop location.

18. The method of claim 1, comprising:
advancing, using the conveyor, a third article along the conveying path;
stopping, by actuating the one or more fingers into the deployed position, the third article at the first stop location;
releasing, by actuating the one or more fingers into the retracted position, the third article from the first stop location;
advancing, using the conveyor, the third article from the first stop location to the second stop location;
stopping, by actuating the one or more paddles into the lowered position, the third article at the second stop location;
releasing, by actuating the one or more paddles into the raised position, the third article from the second stop location; and
moving, using the conveyor, the third article along the conveying path from the second stop location;
wherein the third article is released such that the third article is separated along the conveying path from the second article by the gap that is consistent and at least substantially identical to the gap between the first and second articles.

19. The method of claim 1, wherein the first and second articles are advanced by the conveyor from the first stop location such that a velocity of the first and second articles, upon being released from the first stop location, matches a velocity of the conveyor.

20. The method of claim 1, wherein, as the first article is stopped at the second stop location, the second article is stopped at the first stop location or the second article is not stopped at the first stop location and is advanced by the conveyor towards the second stop location.

21. A system for article processing, the system comprising:
a conveyor configured to advance a first article and a second article along a conveying path;
one or more fingers located at, or adjacent to, a first stop location along the conveying path, the one or more fingers being configured to move between a deployed position and a retracted position for stopping the first article at the first stop location and releasing the first article from the first stop location; and
one or more paddles located at, or adjacent to, a second stop location along the conveying path, the one or more paddles being configured to move between a lowered position and a raised position for stopping the first article at the second stop location and releasing the first article from the second stop location, such that the first article can be advanced by the conveyor along the conveying path beyond the second stop location;
wherein the one or more fingers are configured to, after the first article is released from the first stop location, stop the second article at the first stop location and then release the second article from the first stop location;
wherein the one or more paddles are configured to, after the first article is released from the second stop location, stop the second article at the second stop location; and
wherein the system is configured to release the second article from the second stop location to move, via the conveyor, along the conveying path such that the second article is separated along the conveying path from the first article by a gap; and
wherein, in the deployed position, the one or more fingers extend above a surface of the conveyor at a height sufficient to stop movement of the first and second articles moving along the conveying path at the first stop location and, in the retracted position, the one or more fingers are retracted to a same height as, or below the surface of, the conveyor so that the first and second articles pass over the one or more fingers at the first stop location.

22. The system of claim 21, wherein the one or more fingers comprise at least two fingers that are movable to elevate at least a portion of an article.

23. The system of claim 21, wherein the conveyor comprises one or more conveying belts.

24. The system of claim 23, wherein the one or more conveying belts continue moving when the first article is in the first stop location and when the second article is in the first stop location.

25. The system of claim 21, wherein the one or more paddles are movable and/or pivotable between the lowered position, in which the one or more paddles obstruct, at least partially, the conveying path to stop movement of the first and second articles along the conveying path at the second stop location, and a raised position, in which the one or more paddles do not obstruct the conveying path at the second stop location.

26. The system of claim 21, further comprising a laser or other indicia applicator configured to apply indicia to the first article or the second article while the first or second articles are stopped, respectively, at the first stop location.

27. The system of claim 21, wherein the system is configured to advance the second article along the conveying path to contact and/or abut the first article while the first article is stopped at the first stop location.

28. The system of claim 21, comprising one or more rollers configured to apply pressure to the first article or the second article while the first or second articles are stopped, respectively, at the first stop location.

29. The system of claim 21, wherein the system is configured to determine the gap by either or both of a predetermined time and distance between when the first and second articles are released from the second stop location.

30. The system of claim 21, comprising a detector or sensor to detect a presence of the first article in the second stop location, wherein the system is configured to release the first article from the second stop location when the presence of the first article at the second stop location.

31. The system of claim 21, wherein the one or more fingers are configured to front-end register the first and second articles when the first and second articles are present at the first stop location.

32. The system of claim 21, wherein the system is configured to stabilize the first article at the first stop location on at least three sides of the first article.

33. The system of claim 21, wherein the system is configured advance the first article from the first stop location and to elevate only a first portion of, and not all of, the first article.

34. The system of claim 33, wherein the system is configured such that at least a second portion of the first article maintains contact with the conveyor.

35. The system of claim 21, wherein the first and second articles are cartons or boxes.

36. The system of claim 21, wherein the conveyor is configured to advance the first and second articles from the first stop location such that a velocity of the first and second articles, upon being released from the first stop location, matches a velocity of the conveyor.

37. The system of claim 21, wherein, as the first article is stopped at the second stop location, the second article is stopped at the first stop location or the second article is not stopped at the first stop location and is advanced by the conveyor towards the second stop location.

38. The system of claim 21, wherein the system is configured to advance a third article along the conveying path that is stopped at the first stop location, released from the first stop location, advanced to the second stop location, stopped at the second stop location, released from the second stop location, and moved along the conveying path from the second stop location, wherein the third article is released such that the third article is separated along the conveying path from the second article by the gap that is consistent and at least substantially identical to the gap between the first and second articles.

* * * * *